US012135739B2

United States Patent
Reid et al.

(10) Patent No.: US 12,135,739 B2
(45) Date of Patent: Nov. 5, 2024

(54) GENERATING CONVERSATION TOPICS USING NEURAL NETWORKS

(71) Applicant: Intercom, Inc., San Francisco, CA (US)

(72) Inventors: Fergal Reid, Dublin (IE); Cathal Horan, Dublin (IE); Mario Kostelac, Zagreb (HR)

(73) Assignee: Intercom, Inc., San Francisco, CA (US)

( * ) Notice: Subject to any disclaimer, the term of this patent is extended or adjusted under 35 U.S.C. 154(b) by 0 days.

(21) Appl. No.: 18/112,967

(22) Filed: Feb. 22, 2023

(65) Prior Publication Data

US 2023/0281235 A1 Sep. 7, 2023

Related U.S. Application Data

(60) Provisional application No. 63/313,065, filed on Feb. 23, 2022.

(51) Int. Cl.
  *G06F 16/00* (2019.01)
  *G06F 16/35* (2019.01)

(52) U.S. Cl.
  CPC .......... *G06F 16/353* (2019.01); *G06F 16/355* (2019.01)

(58) Field of Classification Search
  None
  See application file for complete search history.

(56) References Cited

U.S. PATENT DOCUMENTS

| 5,845,049 A * | 12/1998 | Wu .................. G16B 40/00 706/26 |
| 9,672,279 B1 * | 6/2017 | Cohen .................. G06F 16/35 |
| 10,191,985 B1 * | 1/2019 | Sarshar .............. G06F 16/3329 |
| 10,410,626 B1 * | 9/2019 | Sherstinsky ........ H04M 3/5233 |
| 2014/0156624 A1 * | 6/2014 | Alonso ................ G06Q 50/01 707/708 |
| 2016/0055850 A1 * | 2/2016 | Nakadai ................ G10L 15/32 704/235 |
| 2016/0062985 A1 * | 3/2016 | Epstein ................ G06F 40/216 704/9 |
| 2017/0126603 A1 * | 5/2017 | Chen .................... H04L 51/214 |
| 2018/0241764 A1 * | 8/2018 | Nadolski ................ H04L 63/20 |
| 2018/0293607 A1 * | 10/2018 | Huddleston ............ G06Q 50/01 |
| 2018/0351972 A1 * | 12/2018 | Yu ...................... H04L 63/1416 |
| 2019/0121868 A1 * | 4/2019 | Dunne .............. G06F 18/2321 |
| 2019/0188212 A1 * | 6/2019 | Miller .................. H04L 63/145 |
| 2019/0294990 A1 * | 9/2019 | Lopez De Prado ... G06N 20/00 |
| 2020/0004878 A1 * | 1/2020 | Beaumont ............ G06F 16/685 |
| 2020/0035229 A1 * | 1/2020 | Solanki .................. G10L 15/26 |
| 2020/0151254 A1 * | 5/2020 | Wohlwend ............ G06F 40/284 |

(Continued)

*Primary Examiner* — Polina G Peach
(74) *Attorney, Agent, or Firm* — Womble Bond Dickinson (US) LLP

(57) ABSTRACT

A system and method of generating conversation topics using neural networks. The method includes providing, by a processing device, a plurality of conversations to a neural network to generate a plurality of clusters. The method includes selecting, for each cluster of the plurality of clusters, a topic and one or more keywords from one or more n-grams. The method includes evaluating, for each cluster of the plurality of clusters, the topic and the one or more keywords by searching historical conversations and current conversations to identify one or more conversations related to the cluster.

17 Claims, 22 Drawing Sheets

(56) References Cited

U.S. PATENT DOCUMENTS

| | | |
|---|---|---|
| 2020/0227026 A1* | 7/2020 | Rajagopal ............. G06F 16/244 |
| 2021/0027141 A1* | 1/2021 | MacAvaney ............ G06F 17/15 |
| 2021/0056172 A1* | 2/2021 | Bastide ................ H04L 51/046 |
| 2021/0200877 A1* | 7/2021 | Salo ....................... G06F 16/338 |
| 2021/0216928 A1* | 7/2021 | O'Toole ................ G06F 16/287 |
| 2021/0311973 A1* | 10/2021 | Radhakrishnan ....... G06F 40/30 |
| 2022/0138258 A1* | 5/2022 | Misiewicz ............ G06F 16/906 |
| | | 707/737 |
| 2022/0171930 A1* | 6/2022 | Jalaluddin .............. G06N 20/00 |
| 2023/0096118 A1* | 3/2023 | Ramsl ..................... G06F 40/30 |
| | | 707/736 |
| 2023/0161964 A1* | 5/2023 | Shah ..................... G06F 40/166 |
| | | 704/9 |

* cited by examiner

500

On conversation change path

```
# reading from the primary node
advisory_lock_on(conversation_id) do
  conversation = find_conversation(conversation_id)
  real_time_query_backend.ingest(conversation, wait_for_refresh: true)

serialized = serialize(conversation)

# Note that we ask the percolate system to get a list of all topic version ids, not the db.
  # We have to do that because we infer that the topic id that is not returned as matching
  # is a non-matching topic.
  all_active_topic_version_ids = percolate_system.all_topic_version_ids(app: app)
  matching_topic_version_ids = percolate_system.percolate_conversation(serialized)
  non_matching_topics_version_ids = all_active_topic_version_ids - matching_topic_version_ids
  # builds a map with {matching_version_id} => 1, {non_matching_version_id} => 0
  membership_map = build_map(ones: matching_topic_version_ids, zeros: non_matching_topics_version_ids)
  # replace all memberships for this conversation, atomically
  store.replace_topic_memberships((app_id,conversation_id), membership_map)
end
```

On TopicVersion creation

```
# Fanout worker
# make sure topic version is propagated to the Percolate system
topic_version = find_topic_version(topic_version_id)
percolate.ingest(topic_version, wait_for_refresh: true)

# fanout batches
conversation_ids = real_time_query_backend.matching_convos(topic_version)
enqueue_in_batches(conversation_ids, topic_version)
```

Batch worker

```
args: conversation_ids, topic_version_id conversation_ids.each do |conversation_id|
   # operations are strings here, instead of DDB expressions
   store.update_conditionally(
     id: (app_id, conversation_id),
     operation: "set memberships[$topic_version_id] = 1",
     condition:  "membership[$topic_version_id] is not set"
   )
  end
end when propagating the topic, we want to make sure topic ids are propagated to
upstream systems (e.g. reporting)
ingest_conversations_to_reporting(conversations)

if last_batch
   # finish the job, make sure topic.last_propagated_version points to this one
   finish_the_version_propagation!

end
```

Read path

Read path returns just fully propagated versions. It's a simple set intersection op.

```
m = store.read_memberships_record((app_id, conversation_id))
matching_versions = m.topic_memberships.filter { |_k, v| v == 1 }.map(&:first)
propagated_versions = Topic.where(app: app).map(&:latest_propagated_version_id)
return (matching_versions & propagated_versions)
```

| MODEL | TopicVersion | |
|---|---|---|
| KEY | TYPE | DESCRIPTION |
| app_id | Belongs to: App | |
| topic_id | BigInt (Refers to a Topic) | The Topic for which this TopicVersion represents a definition at a given point in time. |
| keyphrases | String | Keeping the definition of a topic. |

FIG. 9

1600 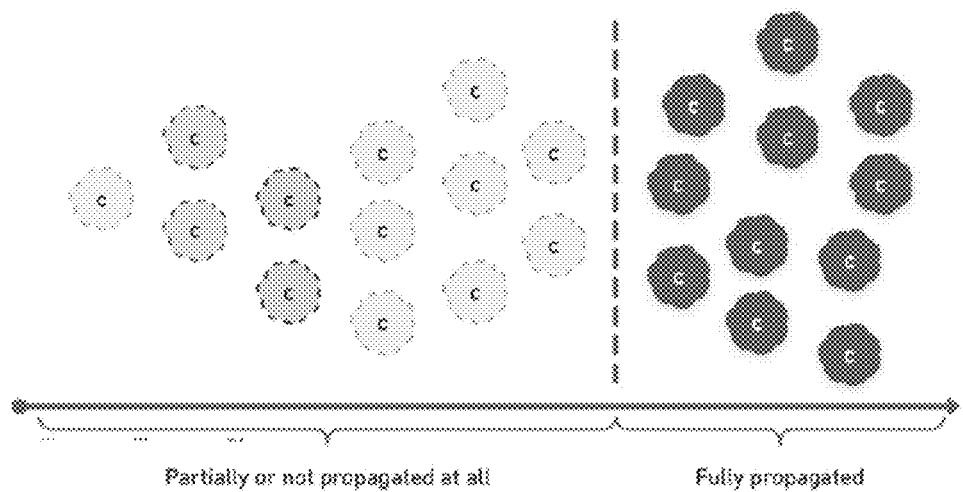
FIG. 16

1700

Data models - before

* computed

2100

providing, by a processing device, a plurality of conversations to a neural network to generate a plurality of clusters
2102 selecting, for each cluster of the plurality of clusters, a topic and one or more keywords from one or more n-grams
2104 evaluating, for each cluster of the plurality of clusters, the topic and the one or more keywords by searching historical conversations and current conversations to identify one or more conversations related to the cluster
2106

FIG. 21

GENERATING CONVERSATION TOPICS USING NEURAL NETWORKS

CROSS-REFERENCE TO RELATED APPLICATIONS

This application claims the benefit of U.S. Provisional Application Ser. No. 63/313,065 entitled "GENERATING CONVERSATION TOPICS USING NEURAL NETWORKS," filed Feb. 23, 2022, the disclosure of which is incorporated herein by reference in its entirety.

TECHNICAL FIELD

The present disclosure relates generally to software technology, and more particularly, to systems and methods of generating conversation topics using neural networks.

BACKGROUND

Neural networks, also known as artificial neural networks (ANNs) or simulated neural networks (SNNs), are a subset of machine learning and are at the heart of deep learning algorithms. Their name and structure are inspired by the human brain, mimicking the way that biological neurons signal to one another. Artificial neural networks (ANNs) include node layers, containing an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed along to the next layer of the network.

SUMMARY

One aspect disclosed herein is directed to a method of generating conversation topics using neural networks. In some embodiments, the method includes providing, by a processing device, a plurality of conversations to a neural network to generate a plurality of clusters. In some embodiments, the method includes selecting, for each cluster of the plurality of clusters, a topic associated with one or more keywords using statistics. In some embodiments, the method includes evaluating topics by searching historical conversations and current conversations to identify conversations related to the cluster.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5 is a diagram depicting an algorithm for changing stored memberships, according to some embodiments;

FIG. 6 is a diagram depicting an algorithm for changing stored memberships, according to some embodiments;

FIG. 9 is a table depicting a TopicVersion data model for conversation topics, according to some embodiments;

FIG. 16 is a block diagram showing an example progressive topic propagation, according to some embodiments;

FIG. 21 is a flow diagram depicting a method of generating conversation topics using neural networks, according to some embodiments.

DETAILED DESCRIPTION

Figure 1:
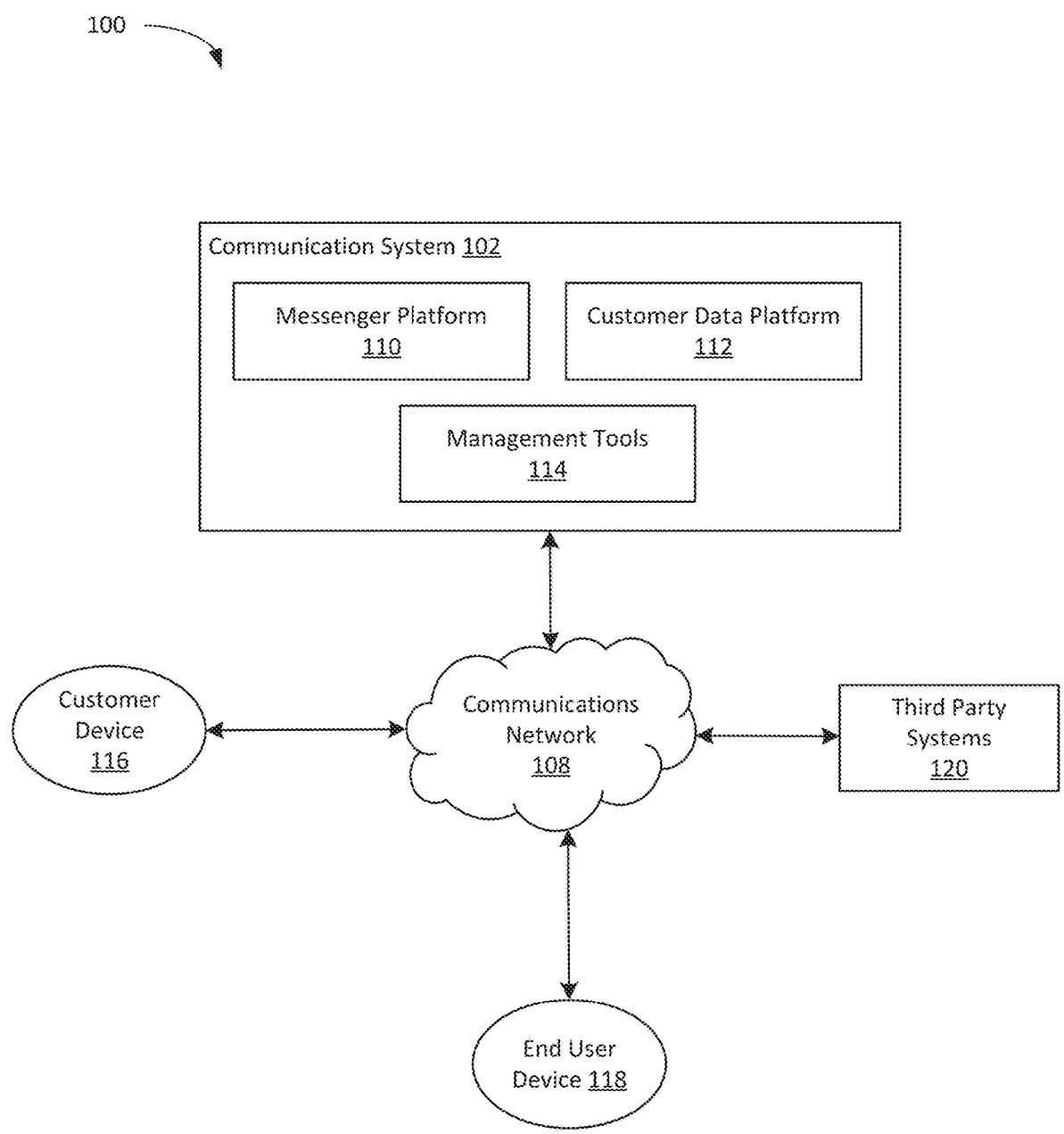
FIG. 1 is a block diagram depicting an example environment for managing communications with users and potential users of a communication system, according to some embodiments.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements.

As used herein, the term "communication system" may refer to the system and/or program that manages communications between individuals and companies. The term "customer" may refer to a company or organization utilizing the communication system to manage relationships with its end users or potential end users(leads). The term "user" and "end user" may refer to a user (sometimes referred to as, "lead") of an end user device that is interfacing with the customer through the communication system. The term "company" may refer to an organization or business that includes a group of users. The term "engineer" or "developer" may refer to staff managing or programing the communication system.

There are several disadvantages with using the conventional system to group conversations according to topics. First, the conventional systems use systematic manual tagging, which provide only sufficient depth insight, and has limited flexibility. Second, the conventional systems use ad hoc deep-dive analyses, which can be effective but are labor intensive and not scalable. Third, topic identification and delineation is difficult for the conventional system to do well up front, as well as, hard to adjust and correct. Fourth, the conventional systems implement techniques to get these insights which are time-consuming.

Aspects of the present disclosure address the above-noted and other deficiencies by generating conversation topics using neural networks. As discussed in greater detail below, a communication system automatically applies topics to a conversation based on keywords in the messages, which saves a support manager's (e.g., a teammate, administrator) time of having to manually tag each conversation. The communication system uses the keywords to define topics and then identifies the conversations that are included in the topics to ensure its accuracy. The communication system also applies updates to a topic across all historical conversations as well as future conversations, thereby simplifying the topic refinement process.

At the highest level, a support manager might want to know the themes and trends of what their customers are writing about, so that they can allocate their support team's efforts effectively. They believe significant value and insight exists within their existing conversations within their network, but it is currently hard to access easily which provides challenges to two priorities.

Topics are a new standard attribute on conversations. They are defined primarily using keywords and apply to all past conversations and future conversations that match the topic in near-real time. Customers can create and update topics through a new Conversation Topics page in reporting, where matching conversations can be inspected while creating the topic to ensure accuracy and relevance. In an email messaging system (sometimes referred to as an inbox), topics auto-apply to matching conversations and can be edited if needed, saving a teammate's time and effort between conversations. This feature is a differentiator against the conventional system that lacks comparable functionality.

Implementing the embodiments of the present disclosure provides several advantages over the conventional system. First, flexible categorization of all conversation topics automatically applies to all historical conversations and are easily updated, so a user (e.g., customer, administrator) can always have accurate reporting of their entire workspace and keep up with other changes in their business. Second, ML-led (machine language) suggestions surface blind spots. That is, ML-led suggestions detect patterns outside the user's topics to improve their total coverage and visibility, so the user knows all the trends and topics of conversations gathered by the communication system. Third, topics auto-apply to new conversations in the inbox (e.g., email messaging system). That is, topics auto-categorize new conversations, saving teammates time in the inbox so they can focus on customer without sacrificing reporting accuracy. Fourth, report on conversation trends in more granular detail. That is, topics can track granular trends accurately so the user can analyze specific patterns easily, by in product reports, custom reports, or via the application programming interface (API).

1. Environment for Generating Conversation Topics Using Neural Networks

FIG. 1 is a block diagram depicting an example environment for managing communications with users and potential users of a communication system, according to some embodiments. As shown, the environment 100 includes a communication system 102 that is interconnected with a customer device 116, an end user device 118, and third-party systems 120 via a communications network 108. The communications network 108 may be the internet, a wide area network (WAN), intranet, or other suitable network. The communication system 102 may be hosted on one or more local servers, may be a cloud-based system, or may be a hybrid system with local servers and in the cloud. The communication system 102 is maintained by engineers which develop management tools 114 that include an interface or editor for clients of the communication system 102 to interface with the communication system 102.

The communication system 102 includes management tools 114 that are developed to allow customers to develop user series or user paths in the form of nodes and edges (e.g., a connection between nodes) that are stored in a customer data platform 112 of the communication system 102. The communication system 102 includes a messenger platform 110 that interacts with user devices 118 in accordance with the user paths stored in the customer data platform 112.

A customer interacts with the communication system 102 by accessing a customer device 116. The customer device 116 may be a general-purpose computer or a mobile device. The customer device 116 allows a customer to access the management tools 114 to develop the user paths stored in the customer data platform 112. For example, the customer device 116 may execute an application using its hardware (e.g., a processor, a memory) to send a request to the communication system 102 for access to a graphical editor, which is an application programming interface (API) stored in the management tools 114. In response to receiving the request, the communication system 102 may send a software package (e.g., executable code, interpreted code, programming instructions, libraries, hooks, data, etc.) to the customer device 116 to cause the customer device 116 to execute the software package using its hardware (e.g., processor, memory). In some embodiments, the application may be a desktop or mobile application, or a web application (e.g., a browser). The customer device 116 may utilize the graphical editor to build the user paths within the graphical editor. The graphical editor may periodically send copies (e.g., snapshots) of the user path as it is being built to the communication system 102, which in turn, stores the user paths to the customer data platform 112. The user paths manage communication of the customer with a user to advance the user through the user paths. The user paths may be developed to increase engagement of a user with the customer via the messenger platform 110.

The messenger platform 110 may interact with a user through an end user device 118 that accesses the communication network 108. The user device 118 may be a general-purpose computer or mobile device that access the communication network 108 via the internet or a mobile network. The user may interact with the customer via a website of the customer, a messaging service, or interactive chat. In some embodiments, the user paths may allow a customer to interface with users through mobile networks via messaging or direct phone calls. In some embodiments, a customer may develop a user path in which the communication system 102 interfaces with a user device via a non-conversational channel such as email.

The communication system 102 includes programs or workers that place users into the user paths developed by the customers stored in the customer data platform 112. The communication system 102 may monitor progress of the users through the user paths developed by the customer and interact with the customer based on the nodes and edges developed by the customer for each user path. In some embodiments, the communication system 102 may remove users from user paths based on conditions developed by the customer or by the communication system 102.

The communication system 102 and/or the customers may employ third party systems 120 to receive (e.g., retrieve, obtain, acquire), update, or manipulate (e.g., modify, adjust) the customer data platform 112 or user data which is stored in the customer data platform 112. For example, a customer may utilize a third-party system 120 to have a client chat directly with a user or may utilize a bot (e.g., a software program that performs automated, repetitive, and/or predefined tasks) to interact with a user via chat or messaging.

Although FIG. 1 shows only a select number of computing devices and/or systems (e.g., communication system 102, customer device 116, third party systems 120, and end user device 118), the environment 100 may include any number of computing devices and/or systems that are interconnected in any arrangement to facilitate the exchange of data between the computing devices and/or systems.

2. Topic and Keywords Generation Via N-Grams

The present disclosure describes the following embodiments of the present disclosure using "we" to simplify the explanation of the embodiments. However, it should be understood that "we," in one or more of these embodiments, implies that the communication system 102 in FIG. 1 is the precise computing device that includes the features and/or carries out the operations that are discussed herein.

Figure 2:
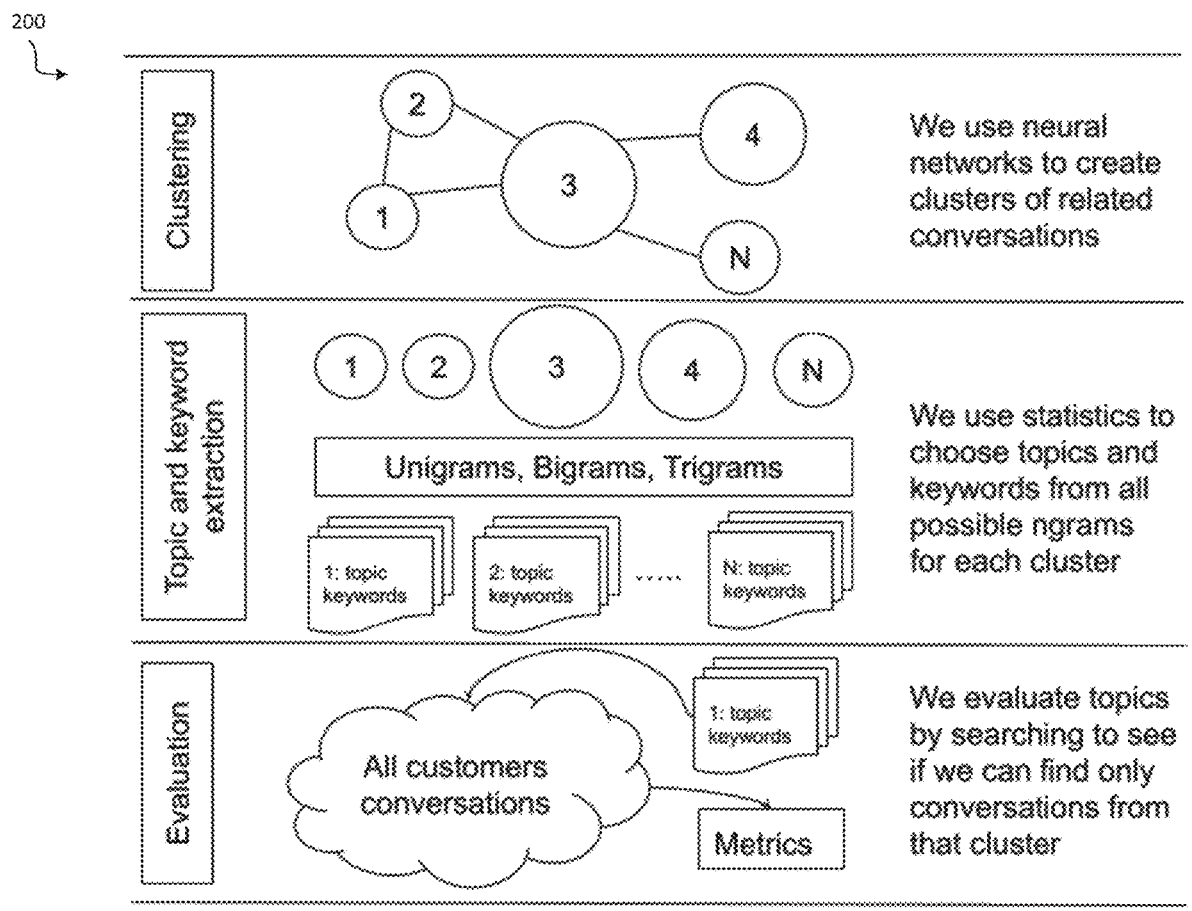
FIG. 2 is a block diagram depicting example phases for generating conversation topics using neural networks, according to some embodiments.

FIG. 2 is a block diagram depicting example phases for performing the topic extraction phase, according to some embodiments. The communication system 102 uses n-grams to identify topics and keywords for a given cluster for conversational insights. The goal is to find topics and/or keywords which enable customers to use them as search terms to find the conversations which belong to that particular cluster. The topic and keyword extraction phase is downstream from the clustering phase which attempts to create clusters of related customer conversations. The communication system 102 then uses a separate series of evaluation metrics to evaluate how well the chosen topics and keywords represent that particular cluster. For example, FIG. 2 is a block diagram depicting example phases for generating conversation topics using neural networks, according to some embodiments. This block diagram outlines these phases and helps frame the findings relating to identifying topics for conversational insights.

2.1 Clustering

The clustering phase uses neural networks to produce clusters of related conversations. The output of this phase serves as the input into the topic and keyword extraction phase where the communication system 102 uses n-grams to find keyword phrases which represent the topic of a particular cluster. The communication system 102 uses an unusual clustering approach leveraging recent developments in neural networks and combining them with network community finding algorithms.

2.1.1 Representing Conversations as Clusterable Data Points

Conversations are normally stored in the communication system 102 as time ordered sets of conversation parts, with each part consisting of one or more text strings. Each conversation part may be associated with an end user or a 'teammate' who works for a customer (e.g., an end user using end user device 118 in FIG. 1) of the customer device 116, or other creator (such as a bot).

To be able to use clustering algorithms to process these conversations, the communication system 102 wants to represent them as vectors rather than text strings. To do this, the communication system 102 uses a transformer based neural network, which has been trained on large amounts of other text, as an encoder. The communication system 102 uses this network to encode specifically the user parts of the conversations as vectors. The communication system 102 runs this process across each customer's historical data, separately, to produce a vector representation of the user parts of their conversation. The communication system 102 uses a batch processing architecture here for computational speed.

2.1.2 Dealing with Computational Challenges

The communication system 102 then wants to process these vectors, to find groups of conversations that are similar. However, there may be a large number of vectors for each customer. To facilitate processing these large number of vectors, the communication system 102 uses efficient similarity search algorithms to cluster dense vectors. This gives the communication system 102 the ability to query the set of vectors to find other vectors that are close to them.

2.1.3 Forming these Points into a Network

To work with these vectors, the communication system 102 first generates a graph, or network, where there is a node in the network for each vector, and where two nodes are connected by an edge if they are 'similar' to each other. The communication system 102 defines similarity here to be a 'cosine similarity' score, as calculated on the vectors, which is above a certain threshold.

As a computational consideration, the communication system 102 also only calculates and stores in the graph, for each node, the top k most similar nodes to it (e.g., k=20). The communication system 102 then produces a network of similar nodes (where each node represents a vector, which in turn represents a conversation).

2.1.4 Running a Network Clustering Algorithm

The communication system 102 clusters conversations by selecting the network of similar conversations and running a network clustering approach on the network. The communication system 102 runs a label propagation community finding algorithm on this network. This clustering algorithm works well at large scale. The communication system 102 then extracts the groups of original conversations that correspond to the clusters found by this approach. The communication system 102 drops exact duplicates found at this stage. This is an unusual approach, to represent conversations as vectors, then produce a graph/network, then run a network clustering algorithm on this, but the communication system 102 finds that it works well, and outperformed many traditional clustering approaches, or outperformed modern clustering algorithms applied directly to the vectors.

2.1.5 N-Gram Extraction Approach

Having found a set of clusters using an unsupervised method, the communication system 102 now wants to try and extract key words and phrases that identify these clusters. The communication system 102 uses one or more of the following three factors to identify cluster topics:

N-grams are bounded by generated clusters: N-grams can only find information within a given cluster. This means they cannot identify if a particular cluster has similar topics or keywords to another cluster. In this way n-grams can only exploit the information available within a particular cluster and cannot use information in other clusters to find potentially related topics. Assuming clusters are created perfectly this should not be an issue. But there will always be some anomalies during clustering and the key point to note here is that n-grams cannot "fix" these anomalies. They can only work with what they are given. An example of a potential issue is that the neural network technology can find semantically related phrases, e.g., "you asked me to email you" and "you asked me to contact you" are semantically similar but n-grams would not be able to capture this semantic similarity.

Cluster sizes vary: There can be a large variance in cluster sizes across different customers. Many customers may have large numbers of small clusters and/or a few large clusters. It can be difficult to generate meaningful n-grams from small clusters and the communication system 102 may need to find ways to identify different levels of significance for different sizes. For example, in a cluster of 10 members a unigram which occurs 5 times is significant whereas in a cluster of 100 members of unigrams occurring 5 times is not significant.

Overlapping topics: With customers that have a large number of small clusters, many of the clusters may represent overlapping topics. As noted in factor 1 above, n-grams might not address this issue. Some clusters may have the same topics or the same keywords and topics. This might be address one or two ways. First, the communication system 102 could try and resolve this at the clustering phase or identify similar topics during the n-gram steps. Alternatively, this may not represent an issue for the customer, and it may be acceptable to show clusters which overlap.

2.2 Topic and Keyword Extraction

Figure 3:
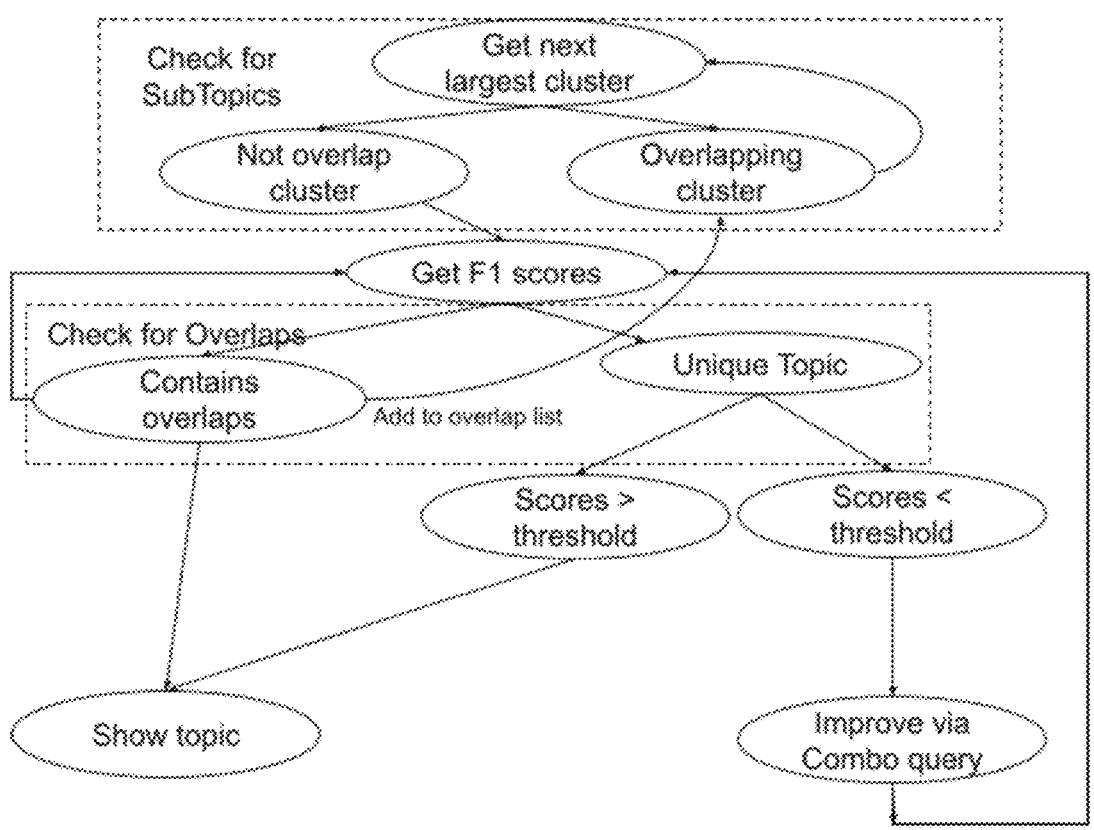
FIG. 3 is a flow diagram depicting a method for performing the topic extraction phase, according to some embodiments.

FIG. 3 is a flow diagram depicting a method for performing the topic extraction phase, according to some embodiments. The goal of the topic extraction process is to identify a collection of conversations which are related to a particular topic (a cluster) and provide the customer with keywords which (1) provide a description of that topic, and (2) enable the customer to search for that topic in their conversation dataset.

A topic can be represented by a single cluster or a connected series of smaller clusters which could be considered "subtopics" of the main topic. For example, there could be one large cluster related to pricing questions, but within that there could be a cluster which related to the pricing of product A and another to the pricing of product B and a final cluster about discounted pricing for different products. These are all related to pricing, but the communication system 102 may decide to show customers the separate, smaller subtopics as well.

2.2.1 Problem(s) with the Convention System

Prior to topic extraction, the communication system 102 uses neural networks to generate sentence embeddings and a graph network to identify semantically related conversations via the sentence embeddings in that conversation. As a result, the input to the topic extraction step is a series of semantically related clusters of conversations.

However, an output of the embedding graph might be a series of semantically related clusters of conversations, which may be difficult for the communication system 102 to manage. For example, the communication system 102 might not know the following information:

(1) Information indicative of the topic or theme of each cluster. For example, the communication system 102 might not know why the embedding graph decided to cluster these conversations together. As another example, the communication system 102 might not know what makes them related conversations.

(2) Information indicative of the keywords that best describe the cluster topic and/or whether these keywords enable customers to find these conversations accurately. For example, the keyword "email" may describe the topic of a cluster, but it is likely to be a poor search term since it will also find conversations which just mention the word email but may not be the main topic of that conversation.

Also, the embedding graph does not properly cluster the conversations as there are multiple separate clusters which can be related to the same topic. It would confuse customers if these were shown as separate clusters and it is difficult to tune the embedding graph to try and properly cluster the conversations into larger clusters since the embedding graph tends to focus on very specific semantic details within a conversation.

As a result, the communication system 102 may use a custom algorithm that takes as its input, semantically clustered micro clusters and generates one or more of the following information: (1) aggregated clusters which represent coherent, customer domain relevant topics and subtopic clusters; (2) descriptions of the topics that clearly identify the topic to a customer; and (3) keywords that enable the customer to search for these conversations.

Thus, the communication system 102 may use semantic methods to initially group the conversations and then apply non-semantic methods on those semantic groups to identify the topic and further group those clusters together into a more human friendly clustering.

2.2.2 Main Phases for Topic Extraction

2.2.2.1 Check for Subtopics

The first step in the algorithm is to take the clusters provided by the embedding graph, starting with the clusters with the most conversations and moving through to the smallest clusters, and identify the overlapping nature of the cluster.

As noted, the output from the embedding graph tends to create smaller clusters which are very closely related. While this is technically accurate it is not useful since it means customers will consider many of the separate clusters to be related to the same topic. This means it will be difficult to identify if a topic is important (in that it occurs in a large volume of conversations) or not. To remedy this, the communication system 102 discovers which graph clusters are related and starts aggregating them together.

As the communication system 102 proceeds through the algorithm, the communication system 102 keeps a list of clusters which are subtopics of other clusters. The communication system 102 might determine that these clusters are part of a larger topic and, as a result, can decide to skip them. This is an important step because the communication system 102 might want to avoid the situation where subtopics can be shared between multiple topics. This would again make it difficult for customers to differentiate between different topics and identify important versus unimportant conversations.

At the start of the algorithm, the communication system 102 will not have identified any subtopics so this check will pass initially until the communication system 102 has identified some subtopics. This phase includes the following three operations (e.g., remedial actions) to prevent processing a duplicate cluster:

Operation 1: Get Next Largest Cluster. This simply takes the input from the graph embedding network starting with the largest to smallest.

Operation 2: Overlapping Cluster. The communication system 102 checks to see if the current cluster has already been considered as a subtopic of another cluster. If it has, then the communication system 102 may decide to not consider it as a separate topic so the communication system 102 may skip this cluster and move on to the next one.

Operation 3: Not Overlap Cluster. If the communication system 102 determines that the current cluster does not appear to be a subtopic of any previously parsed cluster, then the communication system 102 can proceed with this cluster.

2.2.2.2 Get F1 Scores

Once the communication system 102 determines that there is a cluster that is not a subtopic of another cluster, then the communication system 102 identifies the keywords it can use to both describe the cluster and use it to search for conversations in that cluster. The communication system 102 achieves this by using statistical accuracy measurements (e.g., F1 scores). The communication system 102 uses the score to weigh a number of different possible keyword combinations.

For example, the communication system 102 might have the unusual problem of requiring the keywords to not only be useful for searching but also to be descriptive. For example, keywords simply made up from a series of single keywords would not be helpful in describing the nature of the topic to the customer and as a search tool for conversations about this topic. To address this problem, the communication system 102 creates a search query which includes several different multi-keyword phrases.

As a result, the communication system 102 uses a unique combination of multi n-gram (e.g., multiple word) keywords. The communication system 102 may start with three-word (trigram) combinations, then move down to two-word combos (bigram), and/or move to single word (unigram). The communication system 102 may remove duplicate search keyword combos or keyword combos which are parts of larger n-gram phrases. As an example, consider the bigram "engage pricing". The communication system 102 might want to avoid creating a search query such as ("engage pricing" OR "pricing") since the latter term is a superset of the former (e.g., searching for "pricing" will find all matches found by "engage pricing" and, as a result, makes the "engage pricing" term redundant.). Thus, the communication system 102 may use the F1 score to rank the potential search terms to select and test different search terms.

2.2.2.3 Check for Overlaps

Upon completing the F1 scores calculation, the communication system 102 has a search term which can be used to try and identify if this cluster represents a unique topic or if it contains overlaps. Again, the communication system 102 might need to do this to ensure that the clusters represent sensible topics which the customer feels are related and allow them to identify important topics based on conversation volumes.

To do this the communication system 102 uses a custom approach which uses False Positives (FPs) to identify overlapping clusters which represent subtopics of the current cluster. A FP in this case is when the communication system 102 uses the keyword query created in the previous phase to search for conversations.

An FP is a conversation which matches the query but is not part of the current cluster. The communication system 102 measures the ratio of FPs per cluster and uses a set of custom heuristics to consider a cluster to be a subtopic of the current cluster if >80% of its conversations are considered FPs of the current cluster. In other words, the communication system 102 uses the FPs score of a cluster, generated using the F1 ranked search queries, to identify subtopics.

This is important in some specific use cases since the communication system 102 might not want to create topic keyword search terms which also pull in large numbers of conversations which are not part of that specific topic cluster.

The check for overlap phase contains two main operations:

Operation 1: Contains Overlaps. The communication system 102 may use the approach described above to find overlapping clusters via FPs. If the communication system 102 finds clusters equaling to or exceeding a predetermined threshold (e.g., 80%) of their conversations that match this cluster's search term, then the communication system 102 adds them to the overlap list so that the communication system 102 does not consider these clusters in subsequent steps of the main algorithm. The communication system 102 may also recalculate the F1 scores and generate new search terms for the cluster after finding the new subtopics. The reason for this is that the communication system 102 may want to augment the current search query and descriptions based on the new overlap clusters. There may also be terms in those clusters which help improve the F1 scores. If that is the case, then the communication system 102 may use those new queries.

Operation 2: Unique Topic. If the communication system 102 determines that the topic is unique (e.g., it does not have any overlapping clusters), then the communication system 102 checks (e.g., confirms) that the final F1 scores are above a certain threshold. This check ensures that the communication system 102 is choosing the most appropriate terms to represent the cluster's topics. If the communication system 102 determines that the threshold scores are not met, then the communication system 102 can try different query combinations using the original F1 rankings to generate a higher score.

2.3 Evaluation

To evaluate the topics and keywords that are generated by the communication system 102, the communication system 102 uses search results to identify how well those keywords identify the cluster of origin. For example, if a keyword identified a large number of conversations which were not from the cluster of origin then that would result in a poor evaluation score.

If the communication system 102 determines that the scores are greater than a chosen threshold, then the communication system 102 can consider this query to represent a successful or clean topic.

If the communication system 102 determines that scores are less than a given threshold, then the communication system 102 determines if the issue is a result of low TPs or low FPs. There are some scenarios when the communication system 102 can take further steps to try and improve the overall F1 score. For example, if the True Positives (TPs), i.e., that the search query is not finding a high volume of conversations from the original embedding cluster, are low then the communication system 102 can improve the query to pull in more conversations from the original embedding cluster.

If the communication system 102 determines that there are low TPs, then the communication system 102 can increase the TPs by combining other n-grams via logical-OR queries. This should help increase the number of TPs while not increasing FPs beyond the current or threshold levels.

Once the communication system 102 (using the algorithm) has identified all the overlaps, or established that the cluster has no overlaps, it will then consider the process for this cluster completed and store the results to show to customers as a potential suggestion for a conversational topic and move onto the next cluster on the list.

3. Topic Membership System

The following embodiments define a set of conversations matching specific phrases (e.g., "salesforce integration") and structured filters (e.g., "matching message written by end-user").

3.1 High-Level Architecture

A conversation can become/stop being part of the topic in two different scenarios. A first type of event is a conversation change (e.g., added new text that match some topic), which affects memberships for the change conversation only (single). A second type of event is a topic definition change (e.g., keywords changed), which affects memberships for any number of conversations (bulk). Because of the different nature of these two events, the communication system 102 includes one or more subsystems that each react to one or more of the events. If the communication system 102 include multiple subsystems, then each subsystem is configured to work in unison with the other subsystems, such that the multiple subsystems can accurately maintain the memberships as if they are a single system.

Figure 4:
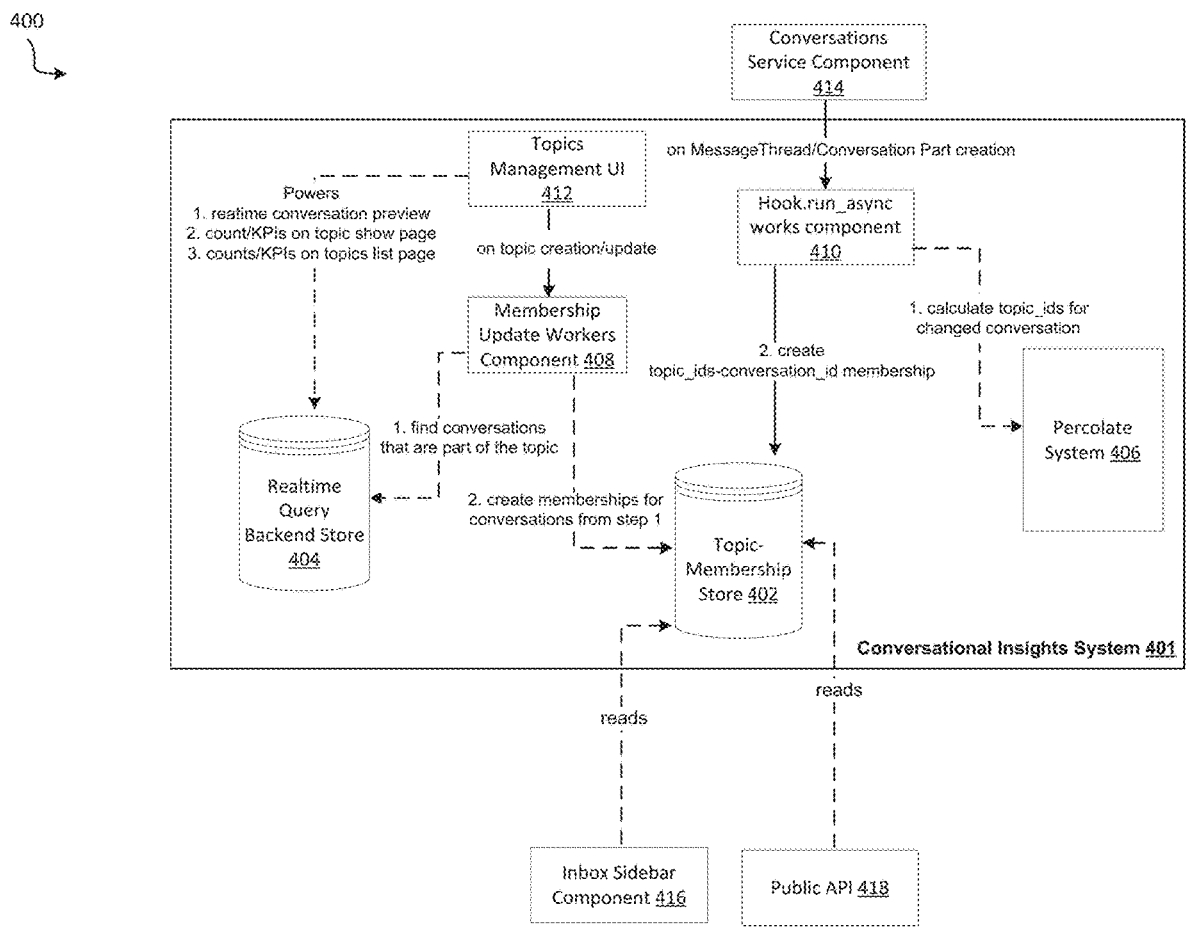
FIG. 4 is a block diagram depicting a topic membership system, according to some embodiments.

FIG. 4 is a block diagram depicting a topic membership system, according to some embodiments. In some embodiments, the topic membership system may be included in the communication system 102 in FIG. 1. In some embodiments, the topic membership system may be separate from the communication system 102 in FIG. 1, but interconnected to facilitate the transfer of messaging and/or data. For simplicity, the processing specific events have been omitted from the diagram.

The topic membership system 400 includes one or more subsystems, components, application programming interfaces (API), and databases for keeping topic memberships correct. The topic membership system 400 includes a conversational insights system 401, a conversations service component 414, an inbox sidebar component 416, and a public API 418.

The conversational insights system 401 includes a topic membership store 402 (e.g., a database), a real time query backend store 404 (e.g., a database), a percolate system 406, a membership update workers component 408, a hook.run_async works component 410, and a topics management user interface (UI) 412.

The topic membership store 402 (e.g., a database) is configured to store all topic memberships, linking conversations, and topics. The real time query backend store 404 (e.g., a database) is configured to answer topic definition queries (e.g., "give me all the conversation_ids that match given topic definition query (these keywords and those predicates)." In some embodiments, this may be the same as performing an Inbox search.

The percolate system 406 is configured to answer the reverse question of the real-time query backend store 404. For example, the percolate system 406 may answer the question, "give me all topic definitions that this conversation matches". In some embodiments, the percolate system 406 may be a system that is analogous to the in-memory matching.

The membership update workers component 408 is configured to coordinate the work and make sure the topic membership store 402 is updated and kept correct. Integrations, such as inbox sidebar component 416 and public API 418 acquire (e.g., receive, retrieve) conversation topics by reading the topic membership store 402.

The communication system 102 can answer several different types of queries. For example, the communication system 102 can calculate topics for a given conversation (knowing all topics for a conversation that changed). As another example, the communication system 102 can calculate conversations for a given topic (knowing which conversations are part of the topic so the communication system 102 can store that membership).

In some embodiments, a single communication system 102 might not be able to answer all types of queries, so the communication system 102 can use the real-time query backend store 404 and/or the percolate system 406 to assist in answering one or more of the queries. In some embodiments, a single system can answer all queries.

3.2 Calculating and Storing Topic Memberships

A topic (as discussed herein) may be a versioned model. A topic may have one or more TopicVersion objects. Every time the topic changes, the communication system 102 create a new TopicVersion for holding a new topic definition. In some embodiments, TopicVersions never change—they represent a snapshot of a topic definition. When a new TopicVersion is fully propagated, the communication system 102 marks (e.g., identifies, flags) the TopicVersion as fully propagated.

3.2.1 the Communication System 102 Works with TopicVersion

System calculating and updating memberships does not have a concept of a Topic, but instead works with TopicVersions. In other words, the topic membership store 402 keeps track of a match between a conversation and a TopicVersion. A conversation can match multiple TopicVersions from the same Topic, but the communication system 102 does not care about it because the communication system 102 still keeps track of all of them. Furthermore, the percolate system 406 returns all TopicVersion documents matching the updated conversation. The percolate system 406 can return multiple TopicVersions that belong to the same Topic.

In some embodiments, the product (e.g., Inbox Sidebar Component 416) may expose one or more topics. For example, tying back TopicVersions to Topics is done on the read path of the conversational insights system 401.

3.2.2 Membership Storage Model

The topic-membership store 402 (e.g., a DynamoDB table) keeps one record per conversation. Topic-membership store 402 maintains all topic version memberships for that conversation.

Memberships are kept in a map (e.g., native DDB type), that maps (e.g., links) topic_version_id->boolean. There are 3 different cases regarding a certain topic_version_id in that map: (1) topic_version_id—>true—TopicVersion is matching the conversation, (2) topic_version_id—>false—TopicVersion explicitly doesn't match the conversation, and (3)

topic_version_id key missing—nobody has written that TopicVersion matches the conversation, therefore—it is not matching.

The system supports two falsy values (e.g., false and key missing) to address specific conflict resolution, as discussed herein.

3.2.3 The Algorithm

There are 2 events that can change the stored memberships, which have very different properties. A first type of event is a TopicVersion creation, which (a) can make a conversation match the new TopicVersion (e.g., topic_version_id, conversation_id), but it cannot make a conversation stop matching the TopicVersion since it's just created; and (b) affects memberships for many conversations, but only for this TopicVersion. A second type of event is a conversation change (any kind), which (a) can either make the conversation start or stop matching any TopicVersion; and (b) affects memberships for many TopicVersions, but for this conversation only.

During the first event and/or the second event, the communication system 102 writes memberships for some (topic-version, conversation-version) pairs, based on what the process handling these events sees. In case of concurrent writes, different processes may see different versions of these objects.

The algorithm ensures that the system (e.g., communication system 102) settles into the correct state—reflecting results for the latest (topic-version, conversation-version). For example, FIG. 5 is a diagram depicting an algorithm for changing stored memberships, according to some embodiments. As another example, FIG. 6 is a diagram depicting an algorithm for changing stored memberships, according to some embodiments.

3.2.3.1 Building an Intuition about Correctness

The algorithm is configured to result in a correct membership, which will now be explained. Cases where only conversations are changing or only TopicVersion objects are created are quite easy to understand from the code itself. However, the real challenge is understanding that the algorithm settles to correct memberships if conversations are changing concurrently as TopicVersions objects are created.

There are several facts that simplify the analysis, though. First, each conversation is independent in this system. For example, the communication system 102 does not have to observe interactions between different conversations. Second, each TopicVersion is independent. For example, the communication system 102 does not have to observe interactions between different TopicVersion objects. Third, TopicVersion is immutable and can only be created. For example, there is only one possible timeline of the TopicVersion—it is created and kicks off a propagation. Fourth, process handling the conversation change is locked with an advisory lock. For example, it is serialized and the communication system 102 can present all of them as they are happening (e.g., in real-time) on one timeline.

Figure 7:
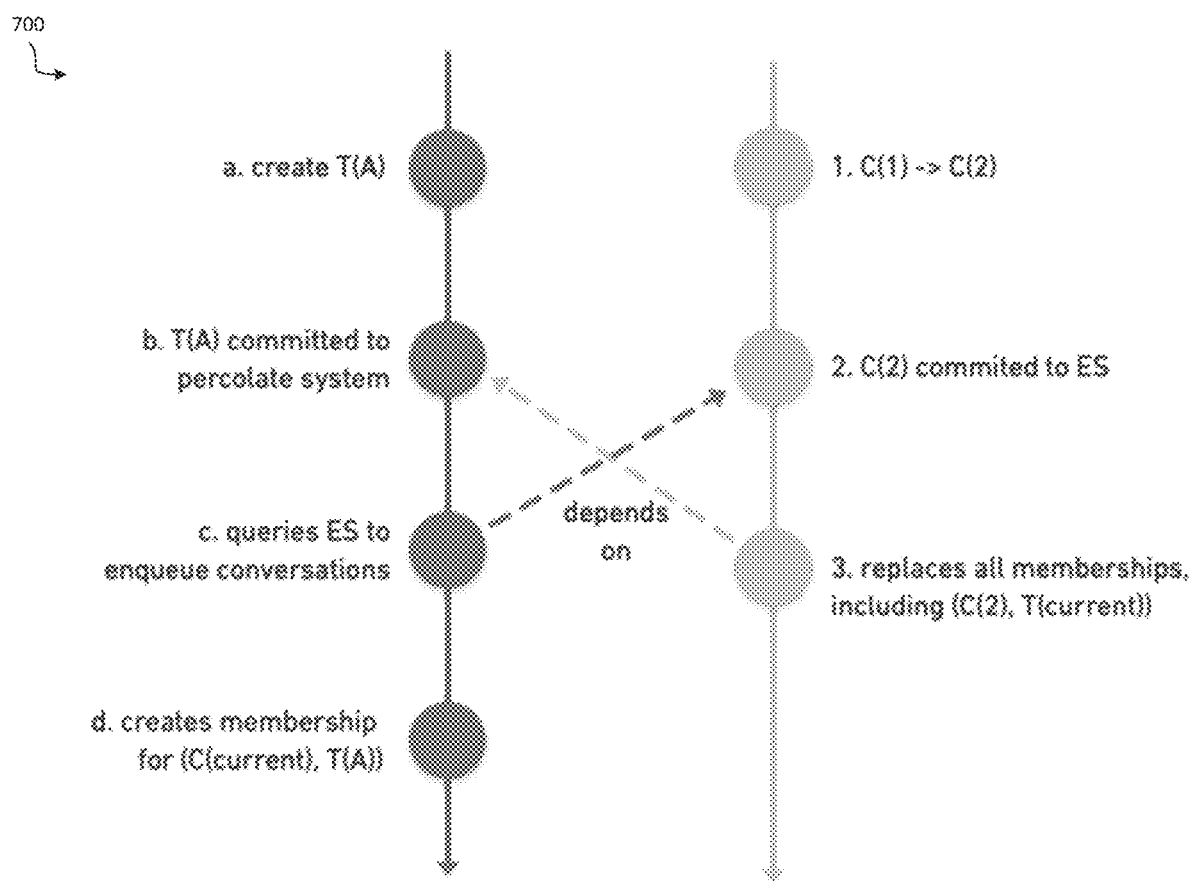
FIG. 7 is a block diagram showing how to create topic version T(A) and a conversation changed from C(1) to C(2), according to some embodiments.

These facts provide a strong ground to present all cases as interactions between one TopicVersion and a sequence of events for one conversation. The following case illustrates correctness:

FIG. 7 is a block diagram showing how to create topic version T(A) and a conversation changed from C(1) to C(2), according to some embodiments. The block diagram 700 includes Operations a, b, c, d, 1, 2, and 3. As shown, both C(1) and C(2) match T(A).

There are two operations reading the value written from other, concurrent process. For example, (1) Operation 3 can read either T(A) or nothing, depending on whether Operation b finished, and (2) Operation c can read either C(2) or C(1), depending on whether Operation 2 finished.

There are four important cases to discuss: Case (1) Operation c after Operation 2, reads C(2); Case (2) Operation 3 after Operation B, reads T(A); Case (3) Operation 3 before Operation b, reads nothing, and Case (4) Operation c before Operation 2, reads C(1).

Figure 8:
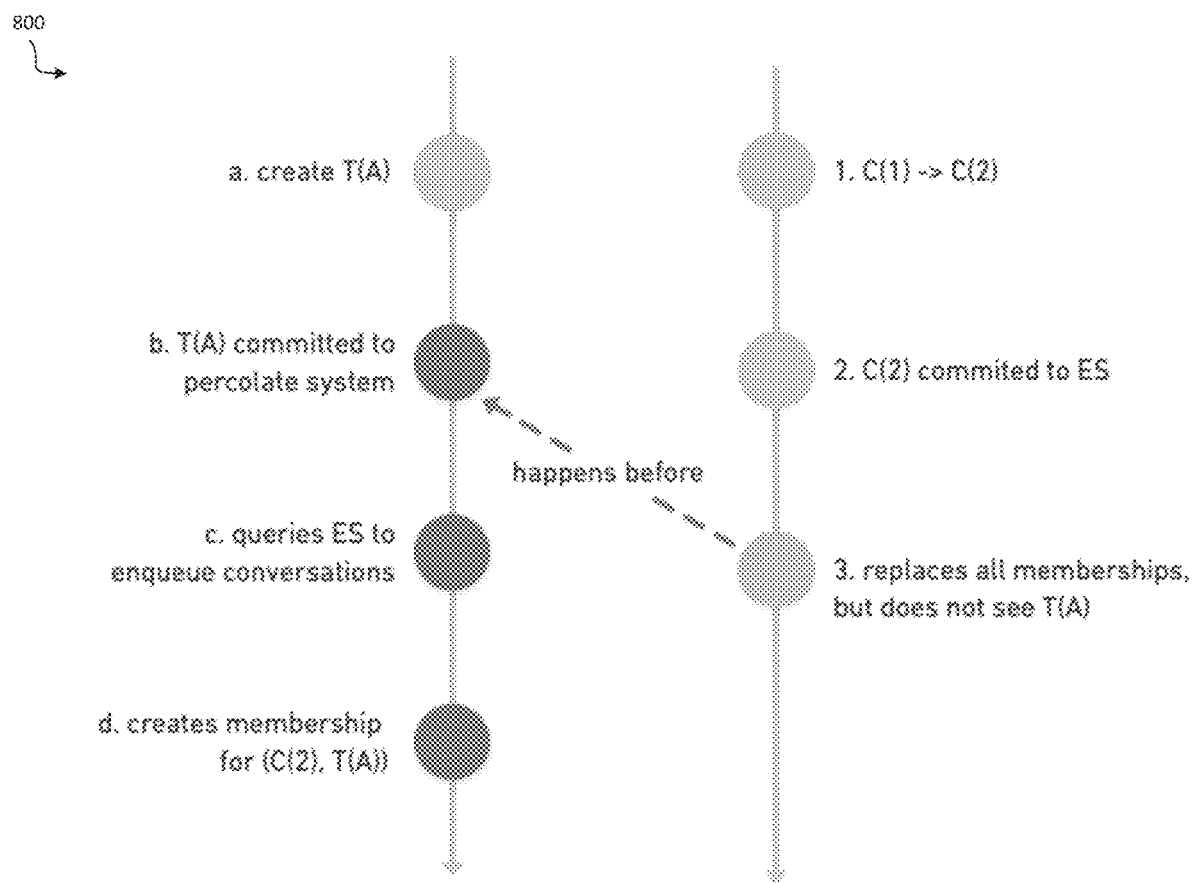
FIG. 8 is a block diagram showing a case where operation 3 before Operation b and reads nothing; according to some embodiments.

For Cases (1) and (2), both processes see the latest version of both objects and it does not matter which write wins. However, Cases (3) and (4) are different. For example, FIG. 8 is a block diagram showing a case where Operation 3 happens before Operation b and reads nothing; according to some embodiments. The block diagram 800 includes Operations a, b, c, d, 1, 2, and 3. As shown, Operations a, 1, and 2 are already executed, and Operation 3 happens before Operation b.

The following occurs in the communication system 102. First, because T(A) was not committed yet, Operation 3 will replace a membership map for a conversation, but will not see T(A) so memberships[T(A)] will not be set. Second, on the topic propagation path, Operation c and d will see the conversation version C(B) and set memberships[T(A)]=1 (because the key T(A) is not set and because C(2) matches T(A)).

3.2.3.2 Data Models

Figure 10:
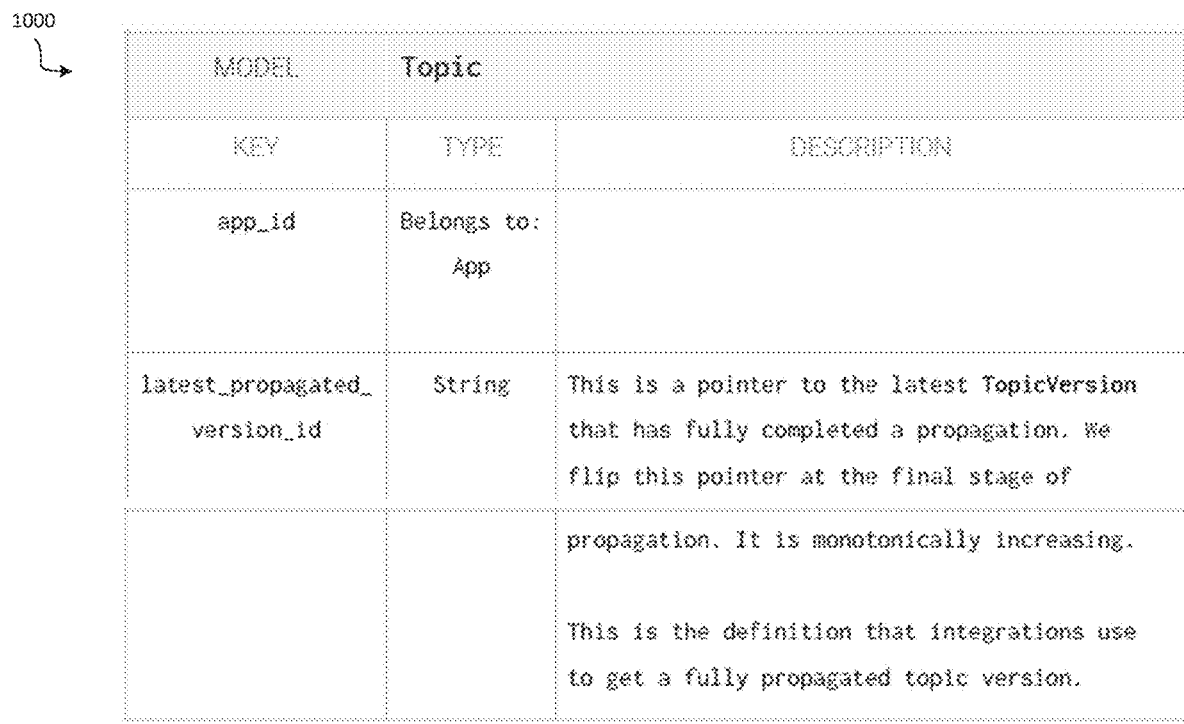
FIG. 10 is a table depicting a Topic data model for conversation topics, according to some embodiments.
Figure 11:
FIG. 11 is a table depicting a TopicMembership data model for conversation topics, according to some embodiments.

FIG. 9 is a table depicting a TopicVersion data model for conversation topics, according to some embodiments. The table 900 shows a plurality of keys, each associated with a type and a description. FIG. 10 is a table depicting a Topic data model for conversation topics, according to some embodiments. The table 1000 shows a plurality of keys, each associated with a type and a description. FIG. 11 is a table depicting a TopicMembership data model for conversation topics, according to some embodiments. The table 1100 shows a plurality of keys, each associated with a type and a description.

3.2.3.3 Optimization: Handling Concurrent TopicVersion Propagation Jobs

In some embodiments, a teammate may edit the topic more than once (e.g., twice) in quick succession, before the first propagation job finished. For example, it might change from A->B->C. In this embodiment, the communication system 102 may determine to not fully propagate version B if it determines that it is not the latest topic definition anymore. To implement this, at the start of a Batch worker on Topic propagation path, the communication system 102 can return early topic_version_id being processed that is not the latest version for that topic. For example, the phrase "finish_early! if topic_version_id<topic.latest_version".

Using advisory locks is just one way to tackle concurrency. The main point is to make sure that concurrent processes do not overwrite each other's values since that can cause the slower process to write stale data. If it proves to be too expensive to use advisory locks on the conversation update path, an optimistic concurrency model on the topic membership record may be used. That would also remove advisory locks db a dependency for the communication system 102, which provides several advantages.

3.3 Orphaned Memberships

This algorithm creates orphaned memberships, which are memberships that point to TopicVersion objects that are older than the latest propagated TopicVersion.

Figure 12:
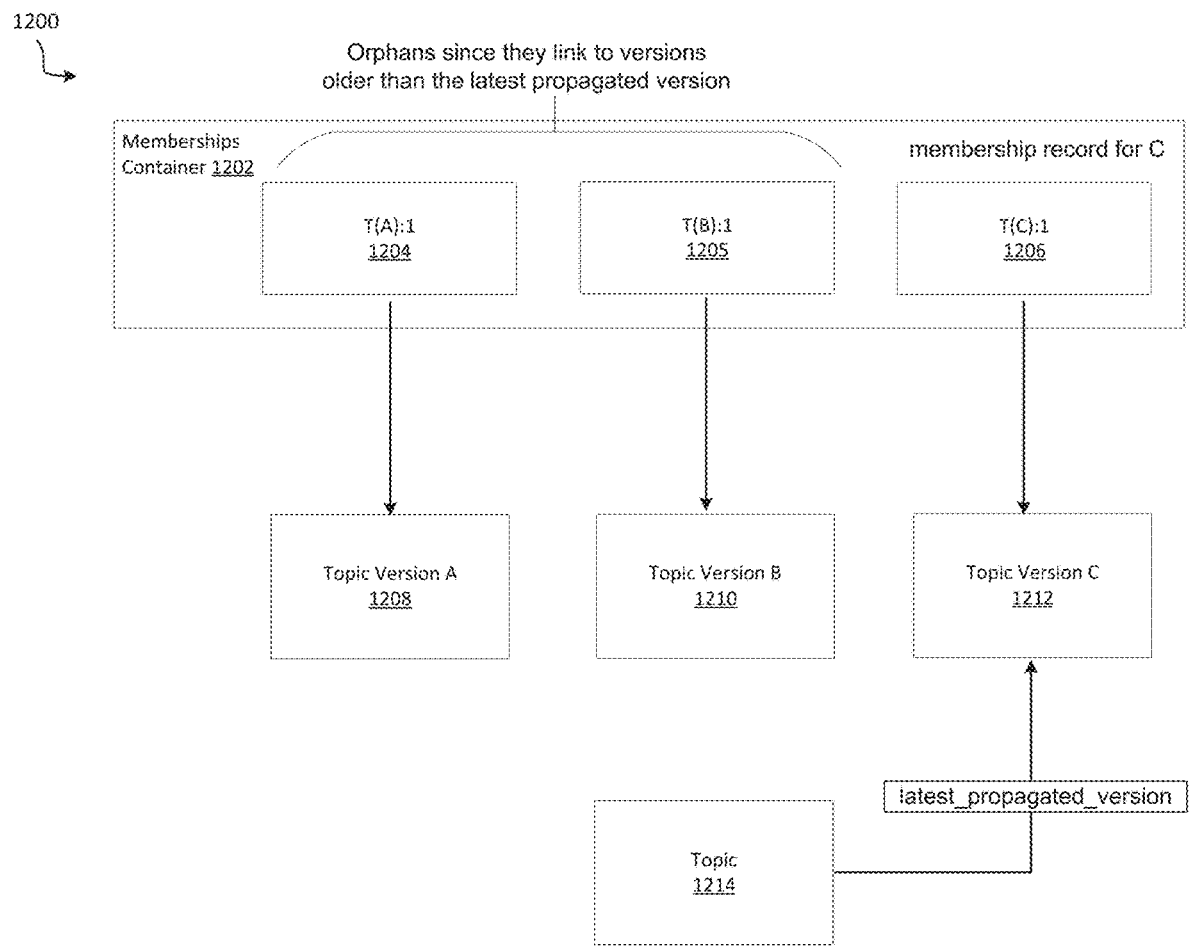
FIG. 12 is a block diagram depicting example orphaned memberships, according to some embodiments.

FIG. 12 is a block diagram depicting example orphaned memberships, according to some embodiments. The diagram includes a memberships container 1202, a topic version A 1208, topic version B 1210, a topic version C 1212, and a topic 1214. The memberships container 1202 includes T(A):1 1204, T(B):1 1205, and T(C):1 1206.

The communication system 102 may create orphaned memberships from two different paths. In a first path, on the conversation update path, the percolate system 406 returns TopicVersion ids that are older than the latest propagated TopicVersion. Conversation update path creates already orphaned membership. In a second path, on the topic propagation path, the communication system 102 issues a conditional write add (T(X), C)=1 to the memberships map. This membership is never orphaned when it is created, but the additional TopicVersion creation will make it orphaned. Topic propagation path creates a valid membership, but it becomes orphaned over time as new TopicVersions are propagated (e.g., out of band). Orphaned memberships can lead to big membership record size, which causes problems, such as, DynamoDB hotspotting, document hitting the max size limit (400 KB), and loading membership record being slow.

The communication system 102 may prevent orphaned memberships on conversation update path. That is, for this kind of orphaned memberships, the communication system 102 already determined that the membership orphaned. Therefore, the communication system 102 may prevent writing it in the first place. For example, the communication system 102 can do that by hooking into the piece of code that executes when the TopicVersion propagation is done. More precisely, when TopicVersion propagation is done, the communication system 102 removes older TopicVersions (for that topic) from the percolate system 406.

3.3.1 Detecting and Cleaning Out-of-Band Orphaned Memberships

To recap, this type or orphaned membership appears as the communication system 102 is changing topic T(A)->T(B)->T(C). If any conversation update comes, it will clean all orphaned memberships by design, but if conversation stays the same, nothing will clean them. There are different approaches to tackle this problem:

There are two distinct operations the communication system 102 needs to clean memberships: (1) detect which records might have orphaned memberships and (2) clean the orphaned membership. There are several feasible strategies to detect records with orphaned memberships: (1) on the read path, the communication system 102 checks how many memberships are orphaned and enqueue cleaning if the number of them is above a certain threshold, (2) tail the dynamodb update stream, with some time delay, enqueue cleaning for these records, and (3) when the topic propagation is done, enqueue cleaning for all conversations that are part of the new topic definition.

Once the communication system 102 has a candidate with potentially orphaned memberships, the communication system 102 can: target a membership for a specific topic version and delete that key from the membership map and recalculate memberships for all active topic versions (like conversation update path).

Figure 13:
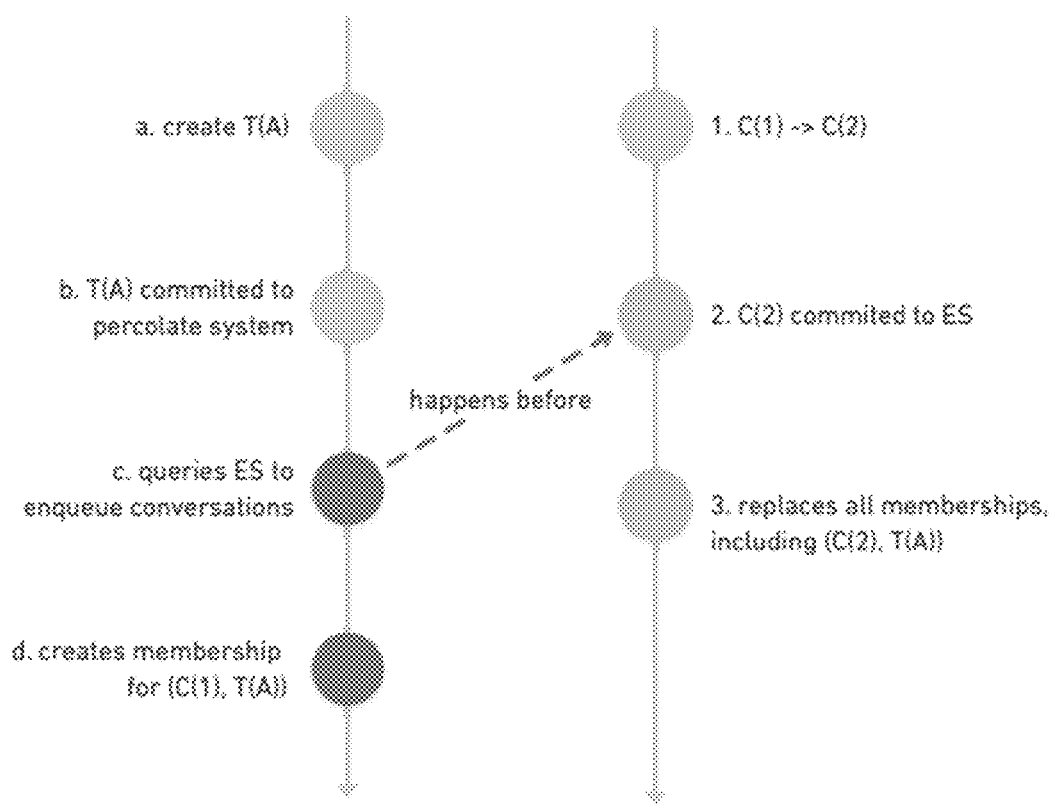
FIG. 13 is a block diagram showing a case where Operation c before Operation 2, reads C(1), according to some embodiments.

FIG. 13 is a block diagram showing a case where Operation c before Operation 2, reads C(1), according to some embodiments. The gray operations are already executed and Operation c happens before Operation 2.

The following occurs (or is performed by) in the communication system 102. First, Operation c queries ES and sees C(1)—it is matching T(A). Second, Operation d enqueues a write for (C(1), T(A)). Third, it does not matter whether Operation d or 3 finish first, something will set memberships[T(A)]=1. There is a very important detail, though. Operation d enqueued a write based on a stale conversation version—C(1). The reason why it settled on the correct memberships is circumstantial—because both C(1) and C(2) match T(A).

Figure 14:
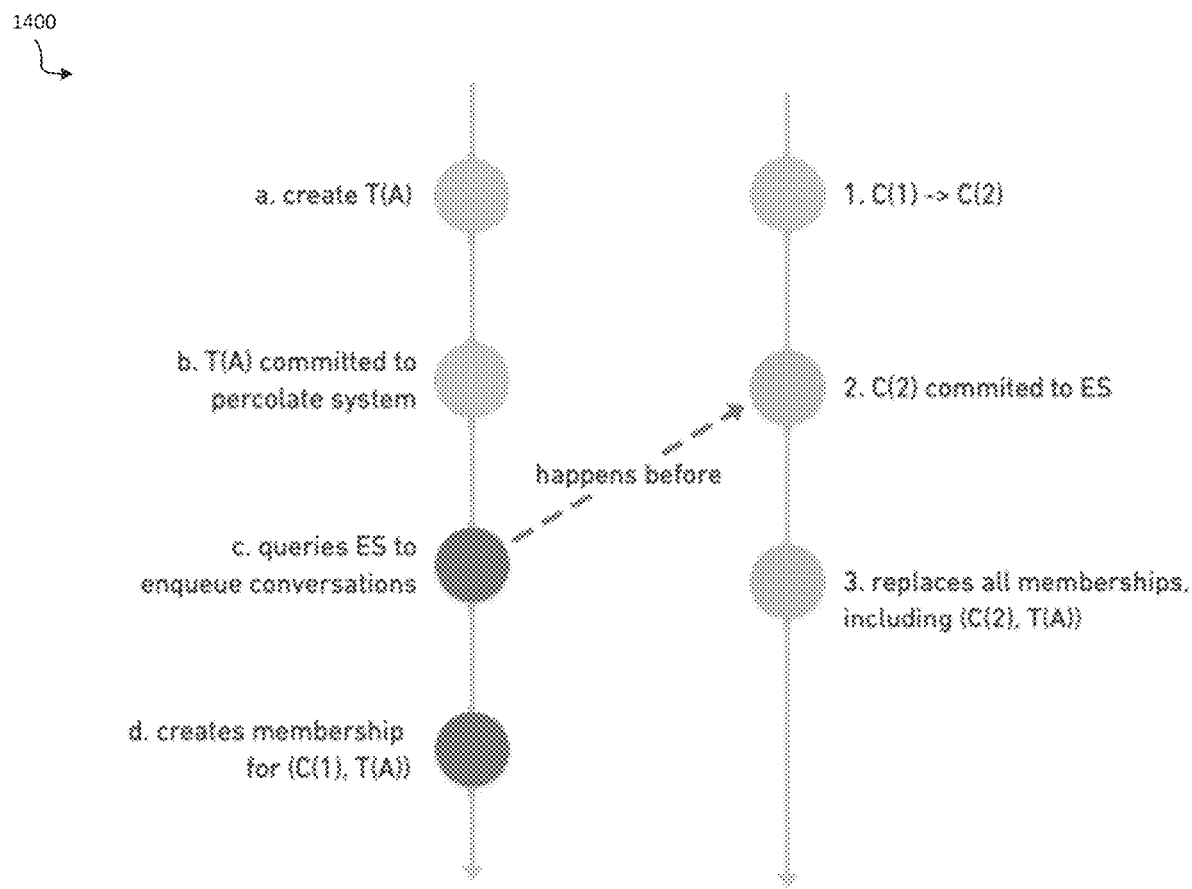
FIG. 14 is a block diagram showing a case where Operation c before Operation 2, reads C(1), and C(1) matches and C(2) does not, according to some embodiments.

That brings attention to one more case. For example, FIG. 14 is a block diagram showing a case where Operation c before Operation 2, reads C(1), and C(1) matches and C(2) does not, according to some embodiments. In this case C(1) matches, but C(2) does not (e.g., the part that was matching is redacted). From previous cases, the communication system 102. knows that Operation c sees C(1). There are two possible scenarios:

In a first scenario, Operation d, then Operation 3. For example, (a) Operation d sets memberships[T(A)]=1 (because C(1) matches and T(A) key is not set), (b) Operation 3 replaces the whole membership map, including [T(A)]=0, and (c) the system settled on the correct value—C(2) does not match T(A).

In a second scenario, Operation 3, then Operation d. For example, (a) Operation 3 replaces the whole membership map, including [T(A)]=0, and (b) Operation d was issued to set memberships[T(A)]=1, but it does not because key T(A) already exists. This is the reason why the communication system 102 needs a conditional write and 2 cases representing that the topic does not match.

Two different write operations and semantics of missing key vs false value. For example, conversation update works with the latest conversation version and explicitly states that some TopicVersion does not match by setting memberships [T(A)]=0. When T(A) key exists in membership map, the communication system 102 can extract two pieces of information: (1) conversation update path performed matching against T(A), and (2) conversation did not match T(A). When an async write from the topic propagation system is dequeued, it performs a conditional write that can be interpreted as "write that it matches T(A) if the other path has not matched the conversation against T(A) already".

3.4 Progressive Topic Propagation

Figure 15:
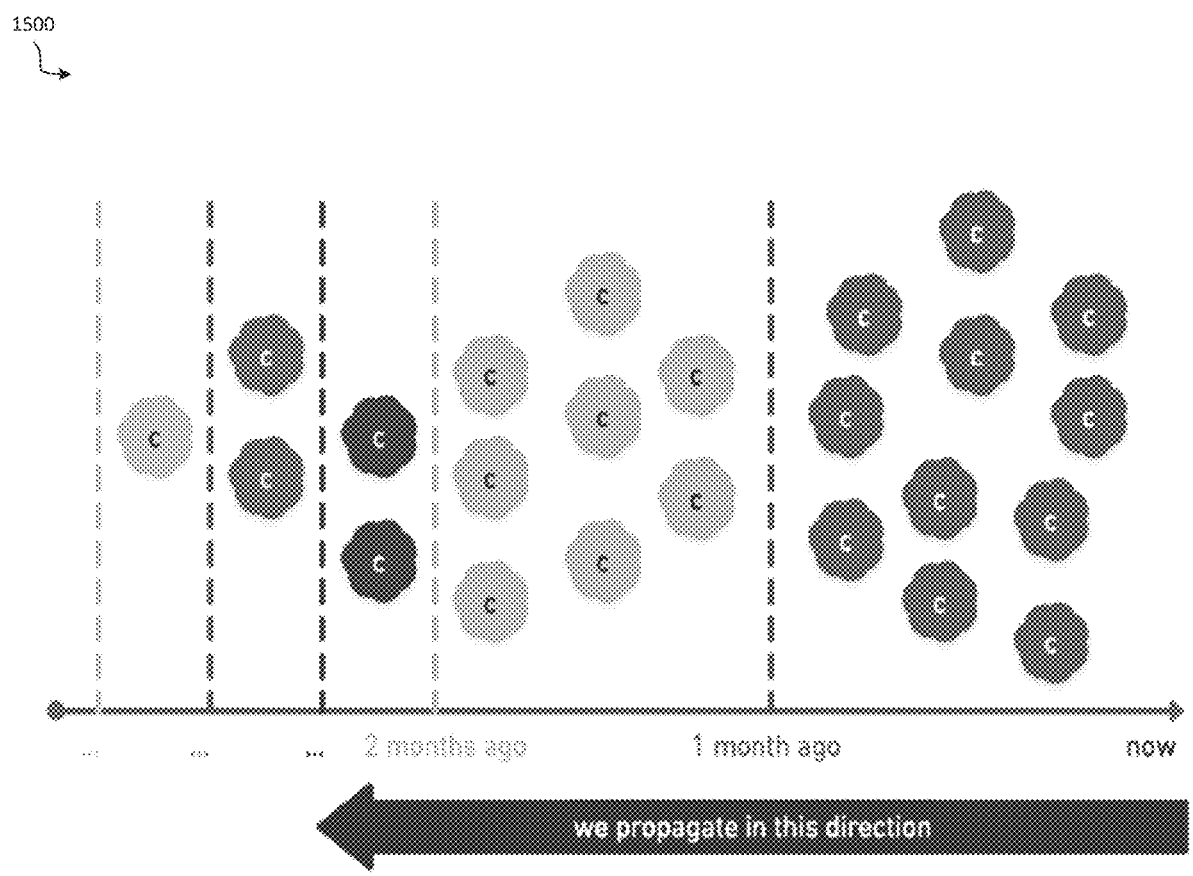
FIG. 15 is a block diagram showing an example progressive topic propagation, according to some embodiments.

FIG. 15 is a block diagram showing an example progressive topic propagation, according to some embodiments. This explains the UI paradigm the communication system 102 uses (in tandem with the algorithm) to make sure the communication system 102 can progressively give more value to the teammates as topics are updating on old conversations.

An example starting point is now presented. First, instead of having topic being propagated either fully or not at all, the communication system 102 wants to propagate the topic in time slices, in reverse chronological order. Second, as a specific time slice is propagated, the communication system 102 wants to be able to know that topic is propagated from [some_point_in_history, now). Thirds, on reporting dashboards: (a) If the date range is within the propagated slice, the communication system 102 wants to use the latest topic version. Optimizes "Time till dashboard usable" after topic creation/topic edit, and (b) if the date range is not within the propagated slice, the communication system 102 determines whether it should fall back on the fully-propagated topic version. Alternatively, the communication system 102 could split the query in two, but that might make Custom Charts/ reporting query building very complicated.

FIG. 16 is a block diagram showing an example progressive topic propagation, according to some embodiments.

There are some advantages to the above implementation. For example, there is an implicit priority between jobs. Furthermore, the further the time slice is from now, the less important it is.

The communication system 102 can track how far each version/job is propagated: (a) make sure to list conversations in specific order (conversation_started_at DESC), (b) group batches into time windows, starting from the most recent one to the oldest one, (b)(1) come up with some simple strategy for grouping them, but make the implementation flexible so the communication system 102 can tweak it later, (b)(2) each group should record the date_low (e.g., lowest conversation datetime it covers) (the oldest group does not have this date, which means it starts from the start of the time), and (c) when all batches in the group finish, that has to be recorded (somewhere).

The communication system 102 can avoid enqueue all groups at the same time, but one by one. This makes sure the communication system 102 does not congest the pipeline with less important batches. It means the communication system 102 uses a fan-out pause/resume, which may be implemented, for example, by storing all IDs to S3 first and then batching from that S3 file. Second, have separate queues for newer and older batches.

Figure 17:
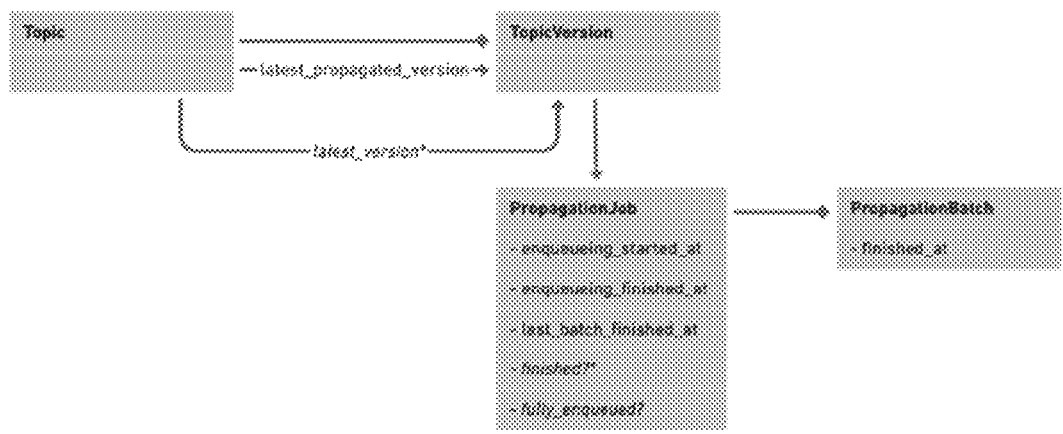
FIG. 17 is a table depicting a data model—before, according to some embodiments.
Figure 18:
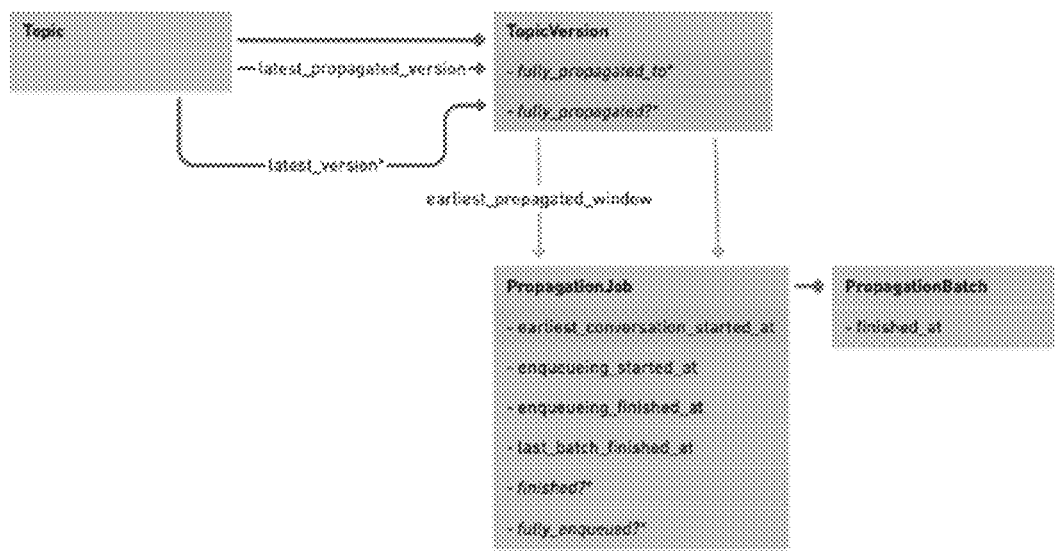
FIG. 18 is a table depicting a data model—after, according to some embodiments.
Figure 19:
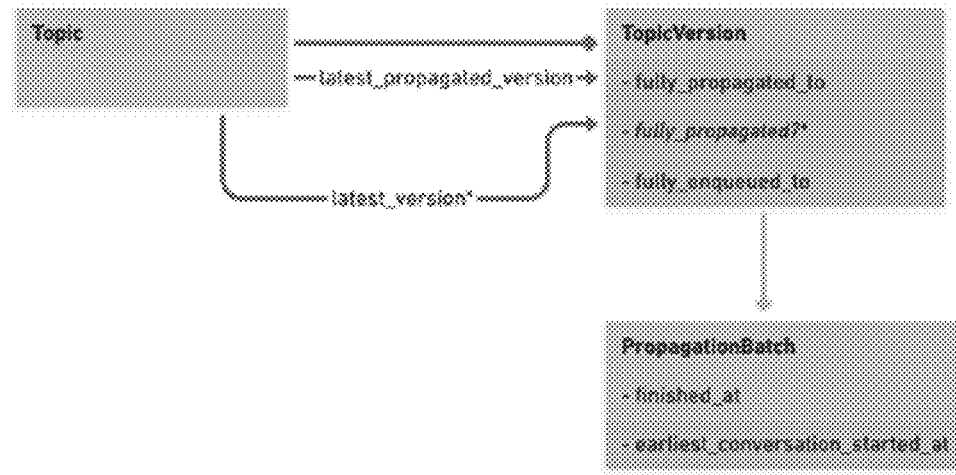
FIG. 19 is a table depicting a data model—after simplified, according to some embodiments.

FIG. 17 is a table depicting a data model—before, according to some embodiments. FIG. 18 is a table depicting a data model—after, according to some embodiments. FIG. 19 is a table depicting a data model—after simplified, according to some embodiments.

Figure 20:
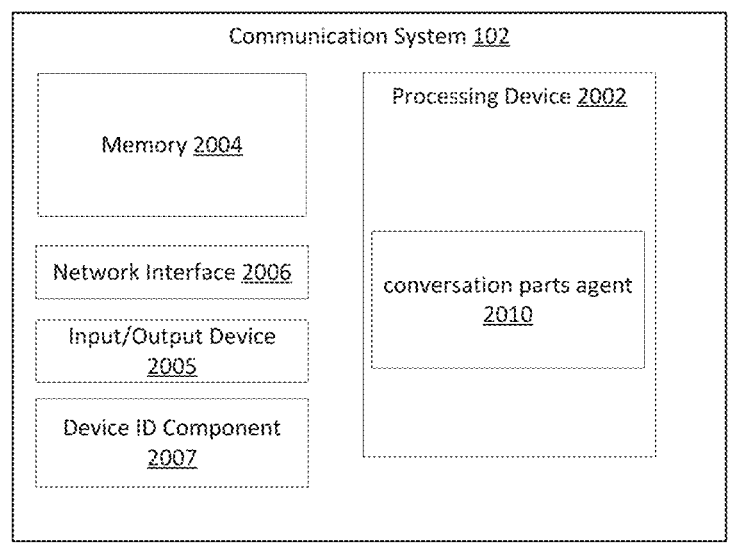
FIG. 20 is a block diagram depicting an example of the communication system 102 in FIG. 1, according to some embodiments.

FIG. 20 is a block diagram depicting an example of the communication system 102 in FIG. 1, according to some embodiments. While various devices, interfaces, and logic with particular functionality are shown, it should be understood that the communication system 102 includes any number of devices and/or components, interfaces, and logic for facilitating the functions described herein. For example, the activities of multiple devices may be combined as a single device and implemented on a same processing device (e.g., processing device 2002), as additional devices and/or components with additional functionality are included.

The communication system 102 includes a processing device 2002 (e.g., general purpose processor, a PLD, etc.), which may be composed of one or more processors, and a memory 2004 (e.g., synchronous dynamic random-access memory (DRAM), read-only memory (ROM)), which may communicate with each other via a bus (not shown).

The processing device 2002 may be provided by one or more general-purpose processing devices such as a microprocessor, central processing unit, or the like. In some embodiments, processing device 2002 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 2002 may include one or more special-purpose processing devices such as an application specific integrated circuit (ASIC), a field programmable gate array (FPGA), a digital signal processor (DSP), network processor, or the like. The processing device 2002 may be configured to execute the operations described herein, in accordance with one or more aspects of the present disclosure, for performing the operations and steps discussed herein.

The memory 2004 (e.g., Random Access Memory (RAM), Read-Only Memory (ROM), Non-volatile RAM (NVRAM), Flash Memory, hard disk storage, optical media, etc.) of processing device 2002 stores data and/or computer instructions/code for facilitating at least some of the various processes described herein. The memory 2004 includes tangible, non-transient volatile memory, or non-volatile memory. The memory 2004 stores programming logic (e.g., instructions/code) that, when executed by the processing device 2002, controls the operations of the communication system 102. In some embodiments, the processing device 2002 and the memory 2004 form various processing devices and/or circuits described with respect to the communication system 102. The instructions include code from any suitable computer programming language such as, but not limited to, C, C++, C#, Java, JavaScript, VBScript, Perl, HTML, XML, Python, TCL, and Basic.

The processing device 2002 may execute a conversation parts agent 2010 that may be configured to provide, by a processing device, a plurality of conversations to a neural network to generate a plurality of clusters. The conversation parts agent 2010 may be configured to select, for each cluster of the plurality of clusters, a topic and one or more keywords from one or more n-grams. The conversation parts agent 2010 may be configured to evaluate, for each cluster of the plurality of clusters, the topic and the one or more keywords by searching historical conversations and current conversations to identify one or more conversations related to the cluster.

The conversation parts agent 2010 may be configured to select, for each cluster of the plurality of clusters, the topic and the one or more keywords from the one or more n-grams by identifying, for each cluster of the plurality of clusters, the topic and the one or more keywords without considering information from another cluster.

The conversation parts agent 2010 may be configured to select, for each cluster of the plurality of clusters, the topic and the one or more keywords from the one or more n-grams by determining a first size of a first cluster of the plurality of clusters; determining a second size of a second cluster of the plurality of clusters; comparing the first size of the first cluster and the second size of the second cluster to a predetermined threshold; categorizing the first cluster according to a first level of significance responsive to comparing the first size of the first cluster to the predetermined threshold; and categorizing the second cluster according to a second level of significance responsive to comparing the second size of the second cluster to the predetermined threshold.

The conversation parts agent 2010 may be configured to determine, based on one or more false positives (FPs), that a first cluster of the plurality of clusters overlaps a second cluster of the plurality of clusters, wherein a FP is a conversation that matches a query without being a part of the first cluster. The conversation parts agent 2010 may be configured to execute a remedial action to prevent processing a duplicate cluster responsive to prevent the first cluster and the second cluster from overlapping.

The conversation parts agent 2010 may be configured to measure a ratio of the FPs per cluster. The conversation parts agent 2010 may be configured to determine, using heuristics, that the first cluster is a subtopic of the second cluster.

The conversation parts agent 2010 may be configured to provide, by the processing device, the plurality of conversations to the neural network to generate the plurality of clusters, by determining, for a candidate cluster of the plurality of clusters, a cluster size to allow an extraction of a highest-order n-gram from the candidate cluster, wherein an n-gram may be a unigram, a bigram, and a trigram; and generating the candidate cluster having the cluster size.

The conversation parts agent 2010 may be configured to evaluate, for each cluster of the plurality of clusters, the topic and the one or more keywords by searching the historical conversations and the current conversations to identify the one or more conversations related to the cluster. The conversation parts agent 2010 may be configured to determine, using search results, an accuracy for each of the one or more keywords, wherein the accuracy indicates how well the one or more keywords identify the cluster.

The communication system 102 includes a network interface 2006 configured to establish a communication session with a computing device for sending and receiving data over the communications network 108 to the computing device. Accordingly, the network interface 2006 includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the communication system 102 includes a plurality of network interfaces 2006 of different types, allowing for connections to a variety of networks, such as local area networks (public or private) or wide area networks including the Internet, via different sub-networks.

The communication system 102 includes an input/output device 2005 configured to receive user input from and provide information to a user. In this regard, the input/output device 2005 is structured to exchange data, communications, instructions, etc. with an input/output component of the communication system 102. Accordingly, input/output device 2005 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of communication system 102, such as a built-in display, touch screen, microphone, etc., or external to the housing of communication system 102, such as a monitor connected to communication system 102, a speaker connected to communication system 102, etc., according to various embodiments. In some embodiments, the communication system 102 includes communication circuitry for facilitating the exchange of data, values, messages, and the like between the input/output device 2005 and the components of the communication system 102. In some embodiments, the input/output device 2005 includes machine-readable media for facilitating the exchange of information between the input/output device 2005 and the components of the communication system 102. In still another embodiment, the input/output device 2005 includes any combination of hardware components (e.g., a touchscreen), communication circuitry, and machine-readable media.

The communication system 102 includes a device identification component 2007 (shown in FIG. 20A as device ID component 2007) configured to generate and/or manage a device identifier associated with the communication system 102. The device identifier may include any type and form of identification used to distinguish the communication system 102 from other computing devices. In some embodiments, to preserve privacy, the device identifier may be cryptographically generated, encrypted, or otherwise obfuscated by any device and/or component of communication system 102. In some embodiments, the communication system 102 may include the device identifier in any communication (e.g., a message that it transmits to the customer device 120, etc.) that the communication system 102 sends to a computing device.

The communication system 102 includes a bus (not shown), such as an address/data bus or other communication mechanism for communicating information, which interconnects the devices and/or components of communication system 102, such as processing device 2002, network interface 2006, input/output device 2005, and device ID component 2007.

In some embodiments, some or all of the devices and/or components of communication system 102 may be implemented with the processing device 2002. For example, the communication system 102 may be implemented as a software application stored within the memory 2004 and executed by the processing device 2002. Accordingly, such embodiment can be implemented with minimal or no additional hardware costs. In some embodiments, any of these above-recited devices and/or components rely on dedicated hardware specifically configured for performing operations of the devices and/or components.

FIG. 21 is a flow diagram depicting a method of generating conversation topics using neural networks, according to some embodiments. Method 2100 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 2100 may be performed by one or more communication systems, such as communication systems 102 in FIG. 1.

With reference to FIG. 21, method 2100 illustrates example functions used by various embodiments. Although specific function blocks ("blocks") are disclosed in method 2100, such blocks are examples. That is, embodiments are well suited to performing various other blocks or variations of the blocks recited in method 2100. It is appreciated that the blocks in method 2100 may be performed in an order different than presented, and that not all of the blocks in method 2100 may be performed.

As shown in FIG. 21, the method 2100 includes the block 2102 providing, by a processing device, a plurality of conversations to a neural network to generate a plurality of clusters. The method 2100 includes the block 2104 of selecting, for each cluster of the plurality of clusters, a topic and one or more keywords from one or more n-grams. The method 2100 includes the block 2106 of evaluating, for each cluster of the plurality of clusters, the topic and the one or more keywords by searching historical conversations and current conversations to identify one or more conversations related to the cluster.

Figure 22:
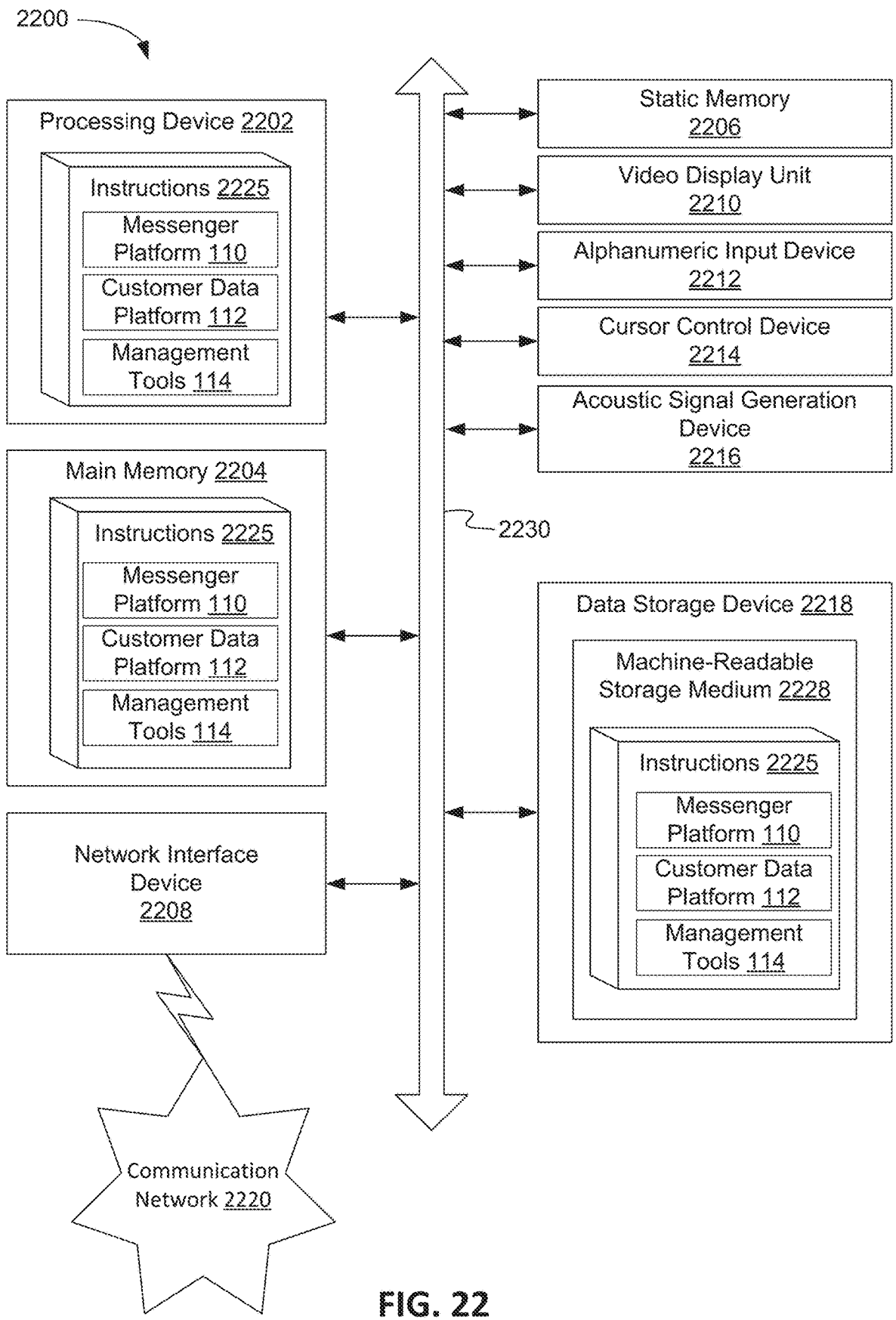
FIG. 22 is a block diagram of an example computing device 2200 that may perform one or more of the operations described herein, in accordance with some embodiments.

FIG. 22 is a block diagram of an example computing device 2200 that may perform one or more of the operations described herein, in accordance with some embodiments. Computing device 2200 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 2200 may include a processing device (e.g., a general-purpose processor, a PLD, etc.) 2202, a main memory 2204 (e.g., synchronous dynamic random-access memory (DRAM), read-only memory (ROM)), a static memory 2206 (e.g., flash memory and a data storage device 2218), which may communicate with each other via a bus 2230.

Processing device 2202 may be provided by one or more general-purpose processing devices such as a microprocessor, central processing unit, or the like. In an illustrative example, processing device 2202 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 2202 may include one or more special-purpose processing devices such as an application specific integrated circuit (ASIC), a field programmable gate array (FPGA), a digital signal processor (DSP), network processor, or the like. The processing device 2202 may be configured to execute the operations described herein, in accordance with one or more aspects of the present disclosure, for performing the operations and steps discussed herein.

Computing device 2200 may further include a network interface device 2208 which may communicate with a communication network 2220. The computing device 2200 also may include a video display unit 2210 (e.g., a liquid crystal display (LCD) or a cathode ray tube (CRT)), an alphanumeric input device 2212 (e.g., a keyboard), a cursor control device 2214 (e.g., a mouse) and an acoustic signal generation device 2216 (e.g., a speaker). In one embodiment, video display unit 2210, alphanumeric input device 2212, and cursor control device 2214 may be combined into a single component or device (e.g., an LCD touch screen).

Data storage device 2218 may include a computer-readable storage medium 2228 on which may be stored one or more sets of instructions 2225 that may include instructions for one or more components (e.g., messenger platform 110, the customer data platform 112, and the management tools 114) for carrying out the operations described herein, in accordance with one or more aspects of the present disclosure. Instructions 2225 may also reside, completely or at least partially, within main memory 2204 and/or within processing device 2202 during execution thereof by computing device 2200, main memory 2204 and processing device 2202 also constituting computer-readable media. The instructions 2225 may further be transmitted or received over a communication network 2220 via network interface device 2208.

While computer-readable storage medium 2228 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "providing," "selecting," "evaluating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein may relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. The terms "comprises", "comprising", "includes", and/or "including", when used herein, may specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

In some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:
   providing, by a processing device, a plurality of conversations to a neural network to generate a plurality of clusters;
   selecting, for each cluster of the plurality of clusters, a topic and one or more keywords from one or more n-grams;
   evaluating, for each cluster of the plurality of clusters, the topic and the one or more keywords by searching historical conversations and current conversations to identify one or more conversations related to the cluster;
   determining, based on one or more false positives (FPs), that a first cluster of the plurality of clusters overlaps a second cluster of the plurality of clusters, wherein a FP is a conversation that matches a query without being a part of the first cluster;
   executing a remedial action to prevent processing a duplicate cluster responsive to determining that the first cluster of the plurality of clusters overlaps the second cluster of the plurality of clusters by generating an updated set of keywords for the first cluster of the plurality of clusters and augmenting a search query associated with the first cluster of the plurality of clusters;
   storing topic memberships by linking the plurality of conversations and the updated set of keywords; and
   configuring a real-time query data store to answer topic queries associated with the topic memberships.

2. The method of claim 1, wherein selecting, for each cluster of the plurality of clusters, the topic and the one or more keywords from the one or more n-grams comprises:
   identifying, for each cluster of the plurality of clusters, the topic and the one or more keywords without considering information from another cluster.

3. The method of claim 1, wherein selecting, for each cluster of the plurality of clusters, the topic and the one or more keywords from the one or more n-grams comprises:
   determining a first size of the first cluster of the plurality of clusters;
   determining a second size of the second cluster of the plurality of clusters;
   comparing the first size of the first cluster and the second size of the second cluster to a predetermined threshold;
   categorizing the first cluster according to a first level of significance responsive to comparing the first size of the first cluster to the predetermined threshold; and
   categorizing the second cluster according to a second level of significance responsive to comparing the second size of the second cluster to the predetermined threshold.

4. The method of claim 1, further comprising:
   measuring a ratio of the FPs per cluster; and
   determining, using heuristics, that the first cluster is a subtopic of the second cluster.

5. The method of claim 1, wherein providing, by the processing device, the plurality of conversations to the neural network to generate the plurality of clusters, comprising:
   determining, for a candidate cluster of the plurality of clusters, a cluster size to allow an extraction of a highest-order n-gram from the candidate cluster, wherein an n-gram may be a unigram, a bigram, and a trigram; and
   generating the candidate cluster having the cluster size.

6. The method of claim 1, wherein evaluating, for each cluster of the plurality of clusters, the topic and the one or more keywords by searching the historical conversations and the current conversations to identify the one or more conversations related to the cluster, further comprising:
   determining, using search results, an accuracy for each of the one or more keywords, wherein the accuracy indicates a degree in which the one or more keywords identify the cluster.

7. A system comprising:
   a memory; and
   a processing device of a first service provider, the processing device is operatively coupled to the memory, to:
      provide a plurality of conversations to a neural network to generate a plurality of clusters;
      select, for each cluster of the plurality of clusters, a topic and one or more keywords from one or more n-grams;
      evaluate, for each cluster of the plurality of clusters, the topic and the one or more keywords by searching historical conversations and current conversations to identify one or more conversations related to the cluster;
      determine, based on one or more false positives (FPs), that a first cluster of the plurality of clusters overlaps a second cluster of the plurality of clusters, wherein a FP is a conversation that matches a query without being a part of the first cluster; and
      execute a remedial action to prevent processing a duplicate cluster responsive to determining that the first cluster of the plurality of clusters overlaps the second cluster of the plurality of clusters by generating an updated set of keywords for the first cluster of the plurality of clusters and augmenting a search query associated with the first cluster of the plurality of clusters;

store topic memberships by linking the plurality of conversations and the updated set of keywords; and configure a real-time query data store to answer topic queries associated with the topic memberships.

8. The system of claim 7, wherein to select, for each cluster of the plurality of clusters, the topic and the one or more keywords from the one or more n-grams, the processing device is further to:

identify, for each cluster of the plurality of clusters, the topic and the one or more keywords without considering information from another cluster.

9. The system of claim 7, wherein to select, for each cluster of the plurality of clusters, the topic and the one or more keywords from the one or more n-grams, the processing device is further to:

determine a first size of the first cluster of the plurality of clusters;

determine a second size of the second cluster of the plurality of clusters;

compare the first size of the first cluster and the second size of the second cluster to a predetermined threshold;

categorize the first cluster according to a first level of significance responsive to comparing the first size of the first cluster to the predetermined threshold; and categorize the second cluster according to a second level of significance responsive to comparing the second size of the second cluster to the predetermined threshold.

10. The system of claim 7, wherein the processing device is further to:

measure a ratio of the FPs per cluster; and determine, using heuristics, that the first cluster is a subtopic of the second cluster.

11. The system of claim 7, wherein to provide the plurality of conversations to the neural network to generate the plurality of clusters, the processing device is further to:

determine, for a candidate cluster of the plurality of clusters, a cluster size to allow an extraction of a highest-order n-gram from the candidate cluster, wherein an n-gram may be a unigram, a bigram, and a trigram; and generate the candidate cluster having the cluster size.

12. The system of claim 7, wherein to evaluate, for each cluster of the plurality of clusters, the topic and the one or more keywords by searching the historical conversations and the current conversations to identify the one or more conversations related to the cluster, the processing device is further to:

determine, using search results, an accuracy for each of the one or more keywords, wherein the accuracy indicates a degree in which the one or more keywords identify the cluster.

13. A non-transitory computer-readable medium storing instructions that, when execute by a processing device of a first service provider, cause the processing device to:

provide, by the processing device, a plurality of conversations to a neural network to generate a plurality of clusters;

select, for each cluster of the plurality of clusters, a topic and one or more keywords from one or more n-grams; and evaluate, for each cluster of the plurality of clusters, the topic and the one or more keywords by searching historical conversations and current conversations to identify one or more conversations related to the cluster;

determine, based on one or more false positives (FPs), that a first cluster of the plurality of clusters overlaps a second cluster of the plurality of clusters, wherein a FP is a conversation that matches a query without being a part of the first cluster; and execute a remedial action to prevent processing a duplicate cluster responsive to determining that the first cluster of the plurality of clusters overlaps the second cluster of the plurality of clusters by generating an updated set of keywords for the first cluster of the plurality of clusters and augmenting a search query associated with the first cluster of the plurality of clusters;

store topic memberships by linking the plurality of conversations and the updated set of keywords; and configure a real-time query data store to answer topic queries associated with the topic memberships.

14. The non-transitory computer-readable medium of claim 13, wherein the processing device is further to:

select, for each cluster of the plurality of clusters, the topic and the one or more keywords from the one or more n-grams comprises:

identify, for each cluster of the plurality of clusters, the topic and the one or more keywords without considering information from another cluster.

15. The non-transitory computer-readable medium of claim 13, wherein the processing device is further to:

determine a first size of the first cluster of the plurality of clusters;

determine a second size of the second cluster of the plurality of clusters;

compare the first size of the first cluster and the second size of the second cluster to a predetermined threshold;

categorize the first cluster according to a first level of significance responsive to comparing the first size of the first cluster to the predetermined threshold; and categorize the second cluster according to a second level of significance responsive to comparing the second size of the second cluster to the predetermined threshold.

16. The non-transitory computer-readable medium of claim 13, wherein the processing device is further to:

measure a ratio of the FPs per cluster; and determine, using heuristics, that the first cluster is a subtopic of the second cluster.

17. The non-transitory computer-readable medium of claim 13, wherein the processing device is further to:

determine, for a candidate cluster of the plurality of clusters, a cluster size to allow an extraction of a highest-order n-gram from the candidate cluster, wherein an n-gram may be a unigram, a bigram, and a trigram;

generate the candidate cluster having the cluster size; and determine, using search results, an accuracy for each of the one or more keywords, wherein the accuracy indicates a degree in which the one or more keywords identify the cluster.

* * * * *